(12) United States Patent
Pitaval et al.

(10) Patent No.: US 11,950,214 B2
(45) Date of Patent: Apr. 2, 2024

(54) DEVICES, METHODS AND COMPUTER PROGRAMS FOR SAVING FREQUENCY RESOURCES IN WIRELESS COMMUNICATIONS

(71) Applicant: Huawei Technologies Co., Ltd., Shenzhen (CN)

(72) Inventors: Renaud-Alexandre Pitaval, Kista (SE); Branislav M. Popovic, Kista (SE); Fredrik Berggren, Kista (SE); Peng Wang, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 609 days.

(21) Appl. No.: 17/150,915

(22) Filed: Jan. 15, 2021

(65) Prior Publication Data
US 2021/0136767 A1    May 6, 2021

Related U.S. Application Data

(63) Continuation of application No. PCT/EP2018/071522, filed on Aug. 8, 2018.

(51) Int. Cl.
*H04W 72/04* (2023.01)
*H04W 72/0453* (2023.01)
(Continued)

(52) U.S. Cl.
CPC ..... *H04W 72/0453* (2013.01); *H04W 74/004* (2013.01); *H04W 74/006* (2013.01); *H04W 74/0833* (2013.01)

(58) Field of Classification Search
CPC ........... H04W 72/0453; H04W 74/004; H04W 74/006; H04W 74/0833; H04W 74/008;
(Continued)

(56) References Cited

U.S. PATENT DOCUMENTS

2014/0342745 A1* 11/2014 Bhushan ............... H04W 28/08
455/450
2017/0135115 A1   5/2017 Cho et al.
(Continued)

FOREIGN PATENT DOCUMENTS

CA    2923551 A1    3/2015
CN    103716895 A   4/2014
(Continued)

OTHER PUBLICATIONS

"UL PHY channels for NR unlicensed," 3GPP TSG RAN WG1 Meeting #93, Busan, Korea, R1-1805921, Total 9 pages, 3rd Generation Partnership Project, Valbonne, France (May 21-25, 2018).
Huawei et al., "Zero-autocorrelation zone of frequency-interlaced Prach," 3GPP TSG RAN WG1 Meeting #93, R1-1806906, Busan, Korea, Total 7 pages, 3rd Generation Partnership Project, Valbonne, France (May 21-25, 2018).
(Continued)

*Primary Examiner* — Mahbubul Bar Chowdhury
(74) *Attorney, Agent, or Firm* — Leydig, Voit & Mayer, Ltd.

(57) ABSTRACT

A client device for wireless communication includes a transceiver and a processor. The transceiver is configured to receive frequency resource information to indicate a set of frequency resources for a physical random access channel (PRACH) preamble transmission. The frequency resource information includes at least one of: an interlace information indicating at least one of an interlace of a block-interlaced frequency-division multiplexing (B-IFDM) allocation, a resource element allocation information indicating a subset of resource elements within each block of the at least one B-IFDM interlace, and a resource element spacing information, such that an at least one resource element within at least one block of the at least one B-IFDM interlace is allocated for the transmission of one PRACH preamble according to a tone-interlaced frequency-division multiplexing (T-IFDM) allocation. The resource element allocation is repeated in each block of the at least one B-IFDM interlace.

16 Claims, 13 Drawing Sheets

(51) Int. Cl.
   *H04W 74/00* (2009.01)
   *H04W 74/0833* (2024.01)
(58) Field of Classification Search
   CPC ... H04L 5/0041; H04L 5/0053; H04L 5/0094; H04L 5/0007
   See application file for complete search history.

(56) References Cited

U.S. PATENT DOCUMENTS

| | | | |
|---|---|---|---|
| 2017/0215207 A1 | 7/2017 | Yi et al. | |
| 2019/0045548 A1* | 2/2019 | Zhang | H04L 5/0017 |
| 2019/0200398 A1* | 6/2019 | Sahlin | H04L 27/2613 |
| 2019/0313458 A1* | 10/2019 | Zeng | H04J 13/0044 |
| 2019/0349998 A1* | 11/2019 | Bhattad | H04W 72/1268 |
| 2019/0387546 A1* | 12/2019 | Li | H04L 27/26132 |
| 2020/0045691 A1* | 2/2020 | Park | H04L 5/0053 |
| 2020/0100251 A1* | 3/2020 | Yerramalli | H04W 72/0453 |
| 2021/0022044 A1* | 1/2021 | Zhang | H04W 28/20 |

FOREIGN PATENT DOCUMENTS

| | | |
|---|---|---|
| CN | 106576341 A | 4/2017 |
| WO | 2012044240 A1 | 4/2012 |
| WO | 2012173565 A1 | 12/2012 |
| WO | 2012173570 A1 | 12/2012 |
| WO | 2016010217 A1 | 1/2016 |
| WO | 2016091285 A1 | 6/2016 |
| WO | 2016163746 A1 | 10/2016 |
| WO | 2017131458 A1 | 8/2017 |
| WO | 2017171847 A1 | 10/2017 |
| WO | 2017196387 A1 | 11/2017 |
| WO | 2018008457 A1 | 1/2018 |
| WO | 2018028775 A1 | 2/2018 |
| WO | 2018045247 A1 | 3/2018 |
| WO | 2018053255 A1 | 3/2018 |
| WO | 2018114370 A1 | 6/2018 |

OTHER PUBLICATIONS

ETSI "5 GHz RLAN; Harmonised Standard covering the essential requirements of article 3.2 of Directive 2014/53/EU," ETSI EN 301 893 V2.1.1, pp. 1-122 (May 2017).

POPOVIC "Optimum Sets of Interference-Free Sequences With Zero Autocorrelation Zones," IEEE Transactions on Information Theory, vol. 64, No. 4, pp. 2876-2882, Institute of Electrical and Electronics Engineers, New York, New York (Apr. 2018).

"3rd Generation Partnership Project; Technical Specification Group Radio Access Network; Evolved Universal Terrestrial Radio Access (E-UTRA); Physical Channels and Modulation (Release 9)," 3GPP TS 36.211 V9.1.0, pp. 1-85, 3rd Generation Partnership Project, Valbonne, France (Mar. 2010).

Lopez, Jr. et al., "Enhancing Critical Infrastructure and Key Resources (CIKR) Level-0 Physical Process Security Using Field Device Distinct Native Attribute Features," IEEE Transactions on Information Forensics and Security, vol. 13, No. 5, pp. 1215-1229, Institute of Electrical and Electronics Engineers, New York, New York (May 2018).

"3rd Generation Partnership Project; Technical Specification Group Radio Access Network; Evolved Universal Terrestrial Radio Access (E-UTRA); Radio Resource Control (RRC); Protocol specification (Release 15)," R2-1806986, 3GPP TS 36.331 V15.1.0, Total 786 pages, 3rd Generation Partnership Project, Valbonne, France (Mar. 2018).

Lee et al., "Adaptive Resource Allocation and Congestion Control Algorithm for Massive Devices in LTE-A," 2018 IEEE Wireless Communications and Networking Conference (WCNC), Total 6 pages, Institute of Electrical and Electronics Engineers, New York, New York (Apr. 15-18, 2018).

"Final Report of 3GPP TSG RAN WG1 #91 v1.0.0 (Reno, USA, Nov. 27-Dec. 1, 2017)," with "TDoc_List_Meeting_RAN1#91" 3GPP TSG RAN WG1 Meeting #92, R1-1801301, Athens, Greece, Total 608 pages, 3rd Generation Partnership Project, Valbonne, France (Feb. 26-Mar. 2, 2018).

* cited by examiner

DEVICES, METHODS AND COMPUTER PROGRAMS FOR SAVING FREQUENCY RESOURCES IN WIRELESS COMMUNICATIONS

CROSS-REFERENCE TO RELATED APPLICATIONS

This application is a continuation of International Application No. PCT/EP2018/071522, filed on Aug. 8, 2018, the disclosure of which is hereby incorporated by reference in its entirety.

FIELD

The present disclosure relates to the field of wireless communications, and more particularly to network node devices, client devices, and related methods and computer programs.

BACKGROUND

The fifth generation (5G) or so called new radio (NR) wireless networks allow operating in a so-called unlicensed spectrum. For example, cellular network operators may of-fload some of their data traffic by accessing the unlicensed spectrum. The 5 gigahertz (GHz) band used by wireless local area network (WLAN) equipment is an example of the unlicensed spectrum in this context.

However, to make this possible, physical random access channel (PRACH) wave-forms used by the NR-unlicensed (NR-U) wireless networks need to be designed to satisfy specific requirements of the unlicensed bands. These requirements include occupied channel bandwidth (OCB). The OCB is the bandwidth containing 99% of the power of the signal. Typ-ically, the OCB of a transmitted signal must be at least 80% of the declared nominal channel bandwidth (NCB), which is the widest band of frequencies, inclusive of guard bands, assigned to a single channel. In on-going standardization, the NCB for a single operating channel has been defined as 20 megahertz (MHz), but a lower NCB of at least 5 MHz can be used by a user equipment (UE).

The requirements of the unlicensed bands further include limits on transmit power and power spectral density (PSD). For example, in on-going standardization, for the frequency range from 5150 MHz to 5350 MHz with transmit power control, the maximum transmit power is limited to 23 decibel-milliwatts (dBm) with a maximum PSD of 10 dBm/MHz. This implies that transmit power may be further limited for a signal with too small an effective transmission bandwidth, which might subsequently decrease the cell coverage. The minimum bandwidth to reach the maximum transmit power while satisfying the maximum PSD is 20 MHz.

The requirements of the unlicensed bands further include performing a listen before talk (LBT) mechanism by a transmitting party before every PRACH transmission.

With so-called interlaced (or interleaved) waveform designs, PRACH frequency resources are allocated in a distributed manner within the NCB in order to fulfill the OCB requirement. An advantage of this waveform design for PRACH is compliance with an interlaced physical uplink shared channel (PUSCH)/physical uplink control channel (PUCCH) design. E.g. in LTE (long term evolution) licensed assisted access (LAA), PUSCH/PUCCH resources are interlaced in the system bandwidth, and similar interlace resource allocation is likely to be needed for NR-U channels.

For an LTE-LAA system band with 20 MHz bandwidth and 15 kHz subcarrier spacing (SCS), an interlace comprises 10 physical resource blocks (PRBs) allocated uniformly every 10th PRB so that a total number of 10 orthogonal interlaces can overlap. It is to be noted that an NR-U system may have a different interlacing structure, e.g. a different number of interlaces, a different number of PRBs/sub-PRBs per interlace and/or different subcarrier spacing.

This LTE LAA interlace structure allows reaching a higher transmit power under the PSD limit than contiguous allocation and without using the full bandwidth. For example, for the PSD limitation of 10 dBm/MHz with a granularity of 1 MHz, the higher transmit power is achieved by allocating only a small portion of the frequency resources per PSD measurement granularity. With the allocation of only one PRB every 10th $PRB_{START}$, the allocated PRBs are uniformly spaced by 1.8 MHz, i.e. more than the PSD measurement granularity, and thus can be transmitted with 10 dBm each. As a result, with 10 PRBs per interlace it is possible to reach a total transmit power of 20 dBm.

However, there are problems that affect NR-U. For example, NR-U PRACH waveform should have resource allocation compatible with interlaced-based NR PUSCH/PUCCH resource allocation which compared to LTE can have different possible SCSs. Yet, if PUSCH/PUCCH and PRACH in neighboring interlaces have different SCSs, they will interfere with each other, and setting guard bands between them is necessary, for example by reserving a blank interlace between the PUSCH/PUCCH and PRACH interlaces. This will however increase overhead and reduce the multiplexing capability of the system.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Embodiments of the present disclosure allow saving frequency resources in wireless communications.

According to a first aspect of the present disclosure, a client device for wireless communication is provided. The client device comprises a transceiver and a processor. The transceiver is configured to receive frequency resource information to indicate a set of frequency resources for a physical random access channel, PRACH, preamble transmission, the received frequency resource information for indicating each frequency resource comprising at least one of: an interlace information indicating at least one of an interlace of a block-interlaced frequency-division multiplexing, B-IFDM, allocation, a resource element allocation information indicating a subset of resource elements within each block of the at least one B-IFDM interlace, and a resource element spacing information, such that an at least one resource element within at least one block of the at least one B-IFDM interlace is allocated for the transmission of one PRACH preamble according to a tone-interlaced frequency-division multiplexing, T-IFDM, allocation and the resource element allocation is repeated in each block of the at least one B-IFDM interlace. The processor is configured to select a frequency resource of the set of frequency resources based at least partially on the received frequency resource information, and generate a PRACH preamble to be transmitted on the selected frequency resource. The transceiver is further configured to transmit the generated PRACH preamble on the selected frequency resource. The present disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability. Furthermore, multiple PRACH sequences can be code-division multiplexed (CDM) in one PRACH frequency resource location, when low cross-correlation between the multiple PRACH sequences is arranged with suitable sequence selection.

In an implementation form of the first aspect, the subset of resource elements comprises a set of subcarriers, and resource element spacing comprises subcarrier spacing. The disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability. Furthermore, multiple PRACH sequences can be code-division multiplexed (CDM) in one PRACH frequency resource location, when low cross-correlation between the multiple PRACH sequences is arranged with suitable sequence selection.

In an implementation form of the first aspect, the blocks in each T-IFDM based PRACH allocation of the multiple T-IFDM based PRACH allocations have the same frequency spacing, which results in different orthogonal PRACH preambles with the same autocorrelation profile, and thus will provide the same timing estimation capability. As a result, a network node device may grant a client device the possibility to randomly pick up one of these T-IFDM PRACH allocations to construct its PRACH preamble. This increases the PRACH orthogonal multiplexing capacity compared to B-IFDM PRACH in prior art.

In an implementation form of the first aspect, multiple T-IFDM based PRACH allocations are frequency-division multiplexed inside the at least one B-IFDM interlace. Frequency-division multiplexing (FDM) of multiple PRACH preambles in the interlace(s) allocated to PRACH allows an increased number of orthogonal PRACH preambles.

In an implementation form of the first aspect, at least one resource element in each block of the at least one B-IFDM interlace is reserved. For example, the saved frequency resource in the PRACH interlace(s) can be reserved for providing guard bands which allows avoiding or mitigating interference between the PRACH preamble(s) and other channels in neighboring interlaces when used with different SCSs.

In an implementation form of the first aspect, the distribution of the subset of resource elements within each block of the at least one B-IFDM interlace is consecutive, non-consecutive and uniform, or non-uniform. An advantage of consecutive resource element allocation pattern(s) and non-uniform resource element allocation pattern(s) is that the cross-talk phenomenon between frequency-division multiplexed T-IFDM PRACHs in the system with carrier frequency offset can be mitigated or avoided to a certain extent, i.e. the probability of falsely detecting a T-IFDM PRACH as its frequency-division multiplexed version can be reduced even with non-zero carrier frequency offset.

In an implementation form of the first aspect, the at least one B-IFDM interlace is indicated with a resource indication value, RIV, a bitmap, or an integer index. Using an RIV allows efficient signaling requiring fewer bits. Using a bitmap requires less signaling overhead as the length of the bitmap may correspond to the spacing between two PRBs of the interlace and thus be shorter. When using an index, the mapping from index to interlace may be stored both at the transmitter and the receiver thus allowing any arbitrary construction of the interlaces, such as non-contiguous interlaces which in turn allows optimizing the set of used interlaces with respect to maximizing the transmit power subject to the PSD constraint by suitably selecting the spacing of the PRBs within the interlace.

In an implementation form of the first aspect, the subset of resource elements within each block of the at least one B-IFDM interlace is indicated with a resource indication value, RIV, a bitmap or an integer index. Using an RIV allows efficient signaling requiring fewer bits. Using a bitmap allows forming any set of resource elements including non-contiguous resource elements. When using an index, the mapping from index to resource element may be stored both at the transmitter and the receiver thus allowing any arbitrary construction of the subset of resource elements, and thereby allowing lower signaling compared to a bitmap when not all resource element locations are utilized.

In an implementation form of the first aspect, the processor is further configured to obtain a remaining part of the frequency resource information from data stored in the client device. The present disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability. Furthermore, multiple PRACH sequences can be code-division multiplexed (CDM) in one PRACH frequency resource location, when low cross-correlation between the multiple PRACH sequences is arranged with suitable sequence selection.

In an implementation form of the first aspect, a remaining part of the frequency resource information comprises pre-determined information or carrier frequency-specific information. The disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability. Furthermore, multiple PRACH sequences can be code-division multiplexed (CDM) in one PRACH frequency resource location, when low cross-correlation between the multiple PRACH sequences is arranged with suitable sequence selection.

According to a second aspect of the present disclosure, a method is provided. The method comprises receiving, by a transceiver in a client device for wireless communication, frequency resource information to indicate a set of frequency resources for a physical random access channel, PRACH, preamble transmission, the received frequency resource information for indicating each frequency resource comprising at least one of: an interlace information indicating at least one of an interlace of a block-interlaced frequency-division multiplexing, B-IFDM, allocation, a resource element allocation information indicating a subset of resource elements within each block of the at least one B-IFDM interlace, and a resource element spacing information, such that an at least one resource element within at least one block of the at least one B-IFDM interlace is allocated for the transmission of one PRACH preamble according to a tone-interlaced frequency-division multiplexing, T-IFDM, allocation and the resource element allocation is repeated in each block of the at least one B-IFDM interlace. The method further comprises selecting, by a processor in the client device for wireless communication, a frequency resource of the set of frequency resources based at least partially on the received frequency resource information. The method further comprises generating, by the processor in the client device for wireless communication, a PRACH preamble to be transmitted on the selected frequency resource. The method further comprises transmitting, by the transceiver in the client device for wireless communication, the generated PRACH preamble on the selected frequency resource. The present disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability. Furthermore, multiple PRACH sequences can be code-division multiplexed (CDM) in one PRACH frequency resource location, when low cross-correlation between the multiple PRACH sequences is arranged with suitable sequence selection.

In an implementation form of the second aspect, the subset of resource elements comprises a set of subcarriers, and resource element spacing comprises subcarrier spacing. The present disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability. Furthermore, multiple PRACH sequences can be code-division multiplexed (CDM) in one PRACH frequency resource location, when low cross-correlation between the multiple PRACH sequences is arranged with suitable sequence selection.

In an implementation form of the second aspect, the blocks in each T-IFDM based PRACH allocation of the multiple T-IFDM based PRACH allocations have the same frequency spacing which leads to different orthogonal PRACH preambles with the same autocorrelation profile, and thus will provide the same timing estimation capability. As a result, a network node device may grant a client device the possibility to randomly pick up one of these T-IFDM PRACH allocations to construct its PRACH preamble. This increases the PRACH orthogonal multiplexing capacity compared to B-IFDM PRACH in prior art.

In an implementation form of the second aspect, multiple T-IFDM based PRACH allocations are frequency-division multiplexed inside the at least one B-IFDM interlace. Frequency-division multiplexing (FDM) of multiple PRACH preambles in the interlace(s) allocated to PRACH allows an increased number of orthogonal PRACH preambles.

In an implementation form of the second aspect, at least one resource element in each block of the at least one B-IFDM interlace is reserved. For example, the saved frequency resource in the PRACH interlace(s) can be reserved for providing guard bands which allows avoiding or mitigating interference between the PRACH preamble(s) and other channels in neighboring interlaces when used with different SCSs.

In an implementation form of the second aspect, the distribution of the subset of resource elements within each block of the at least one B-IFDM interlace is consecutive, non-consecutive and uniform, or non-uniform. An advantage of consecutive resource element allocation pattern(s) and non-uniform resource element allocation pattern(s) is that the cross-talk phenomenon between frequency-division multiplexed T-IFDM PRACHs in the system with carrier frequency offset can be mitigated or avoided to a certain extent, i.e. the probability of falsely detecting a T-IFDM PRACH as its frequency-division multiplexed version can be reduced even with carrier frequency offset.

In an implementation form of the second aspect, the at least one B-IFDM interlace is indicated with a resource indication value, RIV, a bitmap, or an integer index. Using an RIV allows efficient signaling requiring fewer bits. Using a bitmap requires less signaling overhead as the length of the bitmap may correspond to the spacing between two PRBs of the interlace and thus be shorter. When using an index, the mapping from index to interlace may be stored both at the transmitter and the receiver thus allowing any arbitrary construction of the interlaces, such as non-contiguous interlaces which in turn allows optimizing the set of used interlaces with respect to maximizing the transmit power subject to the PSD constraint by suitably selecting the spacing of the PRBs within the interlace.

In an implementation form of the second aspect, the subset of resource elements within each block of the at least one B-IFDM interlace is indicated with a resource indication value, RIV, a bitmap or an integer index. Using an RIV allows efficient signaling requiring fewer bits. Using a bitmap allows forming any set of resource elements including non-contiguous resource elements. When using an index, the mapping from index to resource element may be stored both at the transmitter and the receiver thus allowing any arbitrary construction of the subsets of resource elements, and thereby allowing lower signaling compared to a bitmap when not all resource element locations are utilized.

In an implementation form of the second aspect, a remaining part of the frequency resource information is obtained by the processor from data stored in the client device. The present disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability. Furthermore, multiple PRACH sequences can be code-division multiplexed (CDM) in one PRACH frequency resource location, when low cross-correlation between the multiple PRACH sequences is arranged with suitable sequence selection.

In an implementation form of the second aspect, a remaining part of the frequency resource information comprises pre-determined information or carrier frequency-specific information. The disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability. Furthermore, multiple PRACH sequences can be code-division multiplexed (CDM) in one PRACH frequency resource location, when low cross-correlation between the multiple PRACH sequences is arranged with suitable sequence selection.

According to a third aspect of the present disclosure, a computer program is provided. The computer program comprises program code configured to perform the method according to the second aspect, when the computer program is executed on a computer. The present disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability. Furthermore, multiple PRACH sequences can be code-division multiplexed (CDM) in one PRACH frequency resource location, when low cross-correlation between the multiple PRACH sequences is arranged with suitable sequence selection.

According to a fourth aspect of the present dsiclsoure, a network node device for wireless communication is provided. The network node device comprises a transceiver and a processor. The transceiver is configured to transmit frequency resource information to indicate a set of frequency resources for physical random access channel, PRACH, preamble transmission, the transmitted frequency resource information for indicating each frequency resource comprising at least one of: an interlace information indicating at least one of an interlace of a block-interlaced frequency-division multiplexing, B-IFDM, allocation, a resource element allocation information indicating a subset of resource elements within each block of the at least one B-IFDM interlace, and a resource element spacing information, such that an at least one resource element within at least one block of the at least one B-IFDM interlace is allocated for the transmission of one PRACH preamble according to a tone-interlaced frequency-division multiplexing, T-IFDM, allocation and the resource element allocation is repeated in each block of the at least one B-IFDM interlace. The transceiver is further configured to receive a signal comprising at least one PRACH preamble, each of the at least one PRACH preambles transmitted on one frequency resource of the indicated set of frequency resources. The processor is configured to derive at least one index from the received signal, each derived index corresponding to one of the PRACH preambles contained in the received signal. The present disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability. Furthermore, multiple PRACH sequences can be code-division multiplexed (CDM) in one PRACH frequency resource location, when low cross-correlation between the multiple PRACH sequences is arranged with suitable sequence selection.

In an implementation form of the fourth aspect, at least two PRACH preambles are transmitted on the same frequency resource of the indicated set of frequency resources. In this case, multiple PRACH preambles are code-division multiplexed (CDM) in one PRACH frequency resource location, and low cross-correlation between the multiple PRACH sequences is arranged with suitable sequence selection. The disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability.

In an implementation form of the fourth aspect, at least two PRACH preambles are transmitted on different frequency resources of the indicated set of frequency resources. In this case, multiple PRACH preambles are frequency-division multiplexed (FDM) in the at least one interlace allocated to PRACH, and orthogonality between them are naturally guaranteed regardless of the PRACH sequence selection, which in turn leads to low cross-correlation between them even under non-zero carrier frequency offset. The present disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability.

According to a fifth aspect of the present disclosure, a method is provided. The method comprises transmitting, by a transceiver in a network node device for wireless communication, frequency resource information to indicate a set of frequency resources for physical random access channel, PRACH, preamble transmission, the transmitted frequency resource information for indicating each frequency resource comprising at least one of: an interlace information indicating at least one of an interlace of a block-interlaced frequency-division multiplexing, B-IFDM, allocation, a resource element allocation information indicating a subset of resource elements within each block of the at least one B-IFDM interlace, and a resource element spacing information, such that an at least one resource element within at least one block of the at least one B-IFDM interlace is allocated for the transmission of one PRACH preamble according to a tone-interlaced frequency-division multiplexing, T-IFDM, allocation and the resource element allocation is repeated in each block of the at least one B-IFDM interlace. The method further comprises receiving, by the transceiver in the network node device for wireless communication, a signal comprising at least one PRACH preamble, each of the at least one PRACH preambles transmitted on one frequency resource of the indicated set of frequency resources. The method further comprises deriving, by a processor in the network node device for wireless communication, at least one index from the received signal, each derived index corresponding to one of the PRACH preambles contained in the received signal. The present disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability. Furthermore, multiple PRACH sequences can be code-division multiplexed (CDM) in one PRACH frequency resource location, when low cross-correlation between the multiple PRACH sequences is arranged with suitable sequence selection.

In an implementation form of the fifth aspect, at least two PRACH preambles are transmitted on the same frequency resource of the indicated set of frequency resources. In this case, multiple PRACH preambles are code-division multiplexed (CDM) in one PRACH frequency resource location, and low cross-correlation between the multiple PRACH sequences is arranged with suitable sequence selection. The present disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability.

In an implementation form of the fifth aspect, at least two PRACH preambles are transmitted on different frequency resources of the indicated set of frequency resources. In this case, multiple PRACH preambles are frequency-division multiplexed (FDM) in the at least one interlace allocated to PRACH, and orthogonality between them are naturally guaranteed regardless of the PRACH sequence selection, which in turn leads to low cross-correlation between them even under non-zero carrier frequency offset. The disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability.

According to a sixth aspect of the present disclosure, a computer program is provided. The computer program comprises program code configured to perform the method according to the fifth aspect, when the computer program is executed on a computer. The disclosure allows using less frequency resources for a PRACH preamble in a B-IFDM allocation of multiple user channels while still maintaining the same zero-autocorrelation zone (ZAZ) for the PRACH preambles as that in prior art and thus similar timing estimation capability. Furthermore, multiple PRACH sequences can be code-division multiplexed (CDM) in one PRACH frequency resource location, when low cross-correlation between the multiple PRACH sequences is arranged with suitable sequence selection.

Many of the attendant features will be more readily appreciated as they become better understood by reference to the following detailed description considered in connection with the accompanying drawings.

BRIEF DESCRIPTION OF THE DRAWINGS

In the following, example embodiments are described in more detail with reference to the attached figures and drawings, in which.

In the following, identical reference signs refer to identical or at least functionally equivalent features.

DETAILED DESCRIPTION

In the following description, reference is made to the accompanying drawings, which form part of the disclosure, and in which are shown, by way of illustration, exemplary aspects in which the disclosure may be placed. It is understood that other aspects may be utilized and structural or logical changes may be made without departing from the scope of the disclosure. The following detailed description, therefore, is not to be taken in a limiting sense, as the scope of the disclosure is defined in the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

In the following, a general description of block-interlaced frequency division multiplexing (B-IFDM) is provided based on FIGS. 3A to 3C.

Figure 3A:
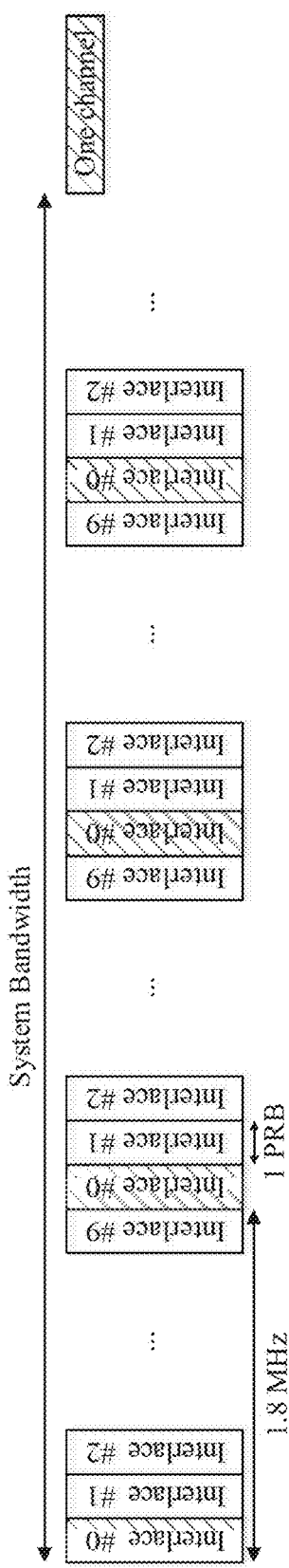
FIG. 3A is a diagram illustrating block-interlaced frequency-division multiplexing (B-IFDM) distributed every 10th physical resource blocks (PRB) of 15 kHz subcarrier spacing (SCS)

Diagram 310 of FIG. 3A illustrates the B-IFDM design from LTE LAA in which an interlace comprises 10 physical resource blocks (PRBs) allocated every 10th PRB with subcarrier spacing (SCS) of 15 kHz, or in other words a total number of 120 resource elements (REs). As shown in FIG. 3A, PRBs in an interlace are spaced by 1.8 MHz. If a constant envelope PRACH sequence is allocated in such an interlace, the time span of a zero-autocorrelation zone (ZAZ) of a PRACH preamble is determined by the frequency spacing of 1.8 MHz and is independent of the selected detailed sequence. If an inverse fast Fourier Transform (IFFT) size in orthogonal frequency division multiplexing (OFDM) modulation is set equal to the effective bandwidth allocation, a ZAZ time span of 1/(1.8 MHz) 0.5 µs is obtained, which corresponds to a maximum roundtrip delay in a cell with a radius of 82 meters (m). With a larger IFFT size and thus a higher sampling rate (as is typical for practical PRACH preambles), ripples may appear in the ZAZ.

Figure 3B:
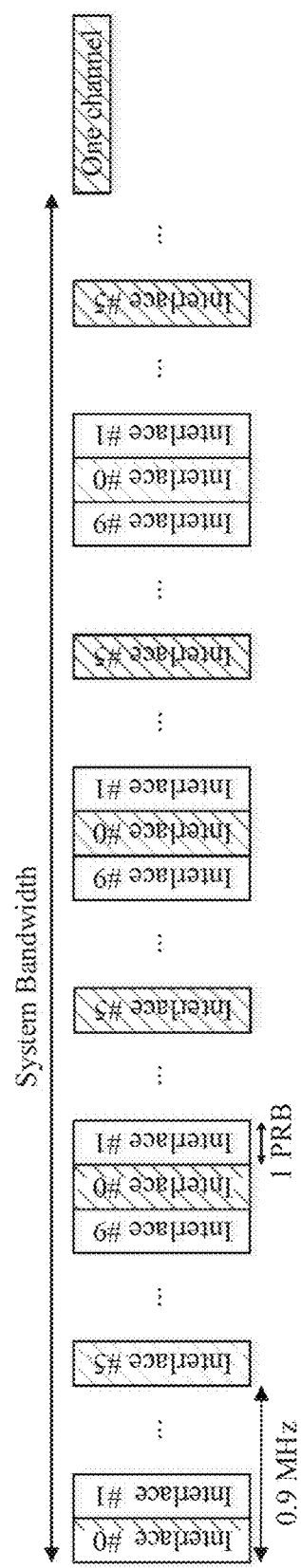
FIG. 3B is a diagram illustrating B-IFDM distributed every 5th PRB of 15 kHz SCS.
Figure 3C:
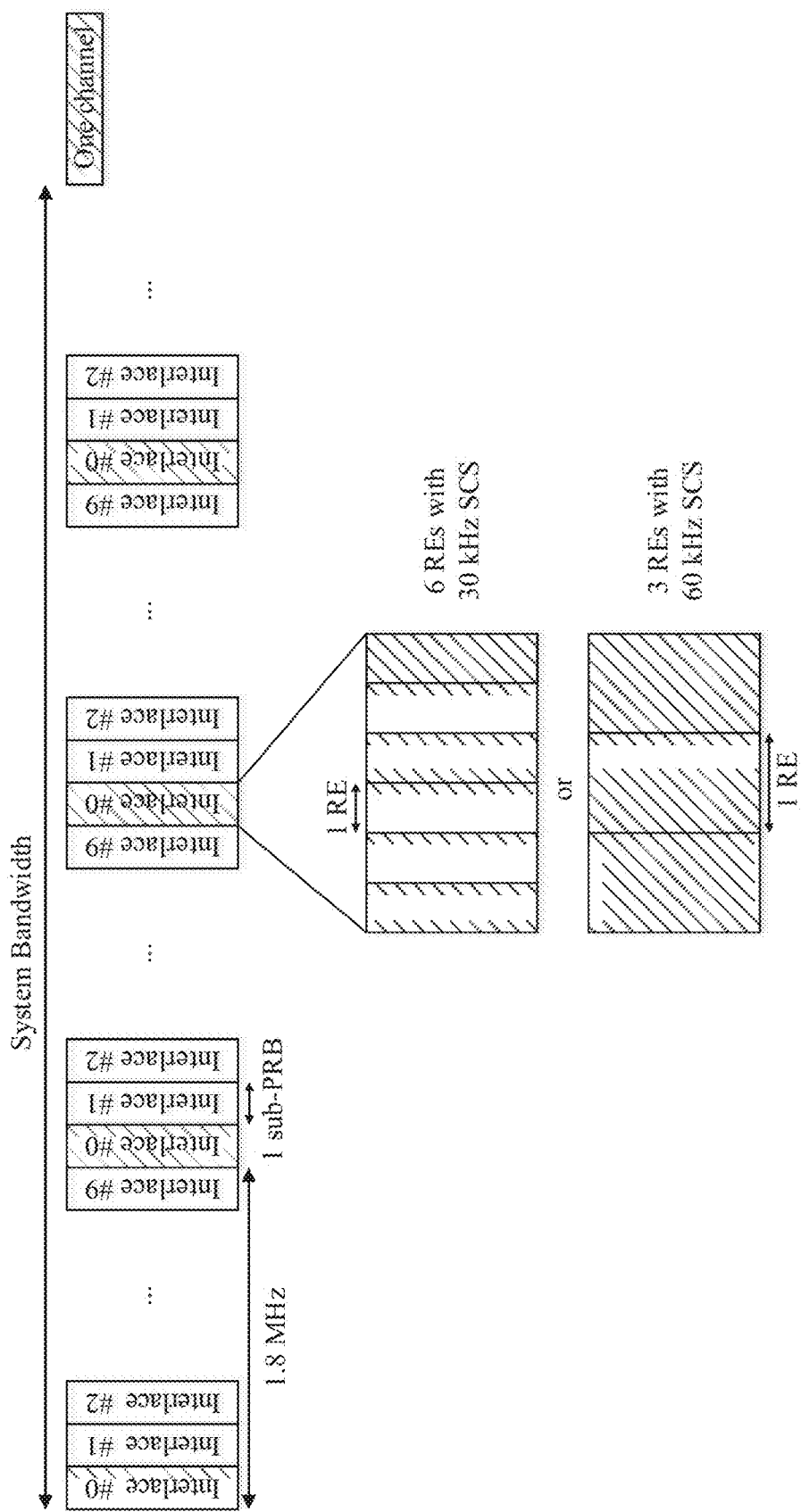
FIG. 3C is a diagram illustrating B-IFDM distributed every 10th sub-PRB with 30 or 60 kHz SCS.

To obtain a longer ZAZ, two equally spaced interlaces can be allocated to one PRACH so that the frequency spacing between the PRBs allocated to one PRACH is now reduced to 0.9 MHz as shown in diagram 320 of FIG. 3B. In this case, a total number of 240 REs are available for use. As a result, the maximum allowable timing offset is 1/(0.9 MHz) 1.1 µs, which corresponds to a maximum roundtrip delay in a cell with a radius of 164 m. If a larger cell radius needs to be supported, more frequency resources need to be allocated to one PRACH which will reduce the multiplexing capability inside B-IFDM.

Moreover, a NR-U PRACH waveform should have resource allocation that is compatible with interlace based NR PUSCH/PUCCH resource allocation, which compared to LTE can have different possible SCSs. In order to keep the same B-IFDM structure under different possible SCSs, blocks in an interlace may not necessarily consist of one PRB with 12 REs. Instead, a block can consist of a sub-PRB with e.g. 6 REs with 30 kHz SCS or 3 REs with 60 kHz SCS, as shown in diagram 330 of FIG. 3C. If PUSCH/PUCCH and PRACH in neighboring interlaces have different SCSs, they will interfere with each other and setting guard bands between them will become necessary, for example by reserving a blank interlace between the PUSCH/PUCCH and PRACH interlaces. However, this will increase overhead and reduce the multiplexing capability of the system.

The present disclosure enables transmission of PRACH preambles fulfilling regu-latory requirements in unlicensed spectrum while allowing multiplexing with other channels and preserving a ZAZ.

As will be discussed in more detail below, the present disclosure involves con-structing PRACH preambles according to a specific tone-interlaced frequency-division multiplexing (T-IFDM) allocation inside at least one interlace of a B-IFDM of multiple user channels (e.g. PRACH, PUSCH, PUCCH). By using T-IFDM inside B-IFDM, at least one subcarrier in each block of one or more B-IFDM interlaces is allocated to a PRACH and the subcarrier allocation is repeated in each block. If multiple subcarriers are allocated in each block for one PRACH preamble, they may be either consecutive or non-consecutive, and either uniform or non-uniform. As a result, each of the active tones in different blocks have a regular frequency spacing equal to the frequency spacing of blocks of the B-IFDM interlace(s) allocated to the PRACH, which defines the autocorrelation profile of the preambles and thus their timing estimation capabilities. In an embodiment of only one tone per block, all the active tones of the PRACH are equally spaced in the frequency domain, and the same low peak-to-average power property as that for consecutive tone allocation can be maintained when Zadoff-Chu (ZC) sequences are used. The positions of subcarriers allocated by T-IFDM inside B-IFDM for the PRACH can be e.g. predetermined or signaled from a network node device to client devices.

The autocorrelation profile of the B-IFDM PRACH is determined by the frequency spacing between the blocks of the frequency resources in the interlace(s). The size of the blocks (e.g. a PRB, a sub-PRB, a single tone or a few tones) that are allocated to a single PRACH interlaced transmission in B-IFDM does not impact the autocorrelation properties. The same autocorrelation profile is obtained for any sequences with the same envelope spectrum repeated in all equally distributed blocks in the interlace(s). As a result, the same ZAZ time span for precise timing estimation can be obtained by T-IFDM of the PRACH allocated inside a given B-IFDM structure using at least one tone index in each block of the B-IFDM interlace(s) allocated to the PRACH.

A T-IFDM PRACH inside B-IFDM can fulfill similar occupied channel bandwidth (OCB) and power spectral density (PSD) requirements for unlicensed spectrum as B-IFDM in prior art. Because the T-IFDM PRACH is allocated inside the B-IFDM, it results in the same OCB as B-IFDM in prior art. Also, the power allocated to a block (e.g. a PRB, a sub-PRB) of the B-IFDM can be equivalently allocated to the selected one or multiple REs in each block. As a result, the T-IFDM PRACH inside the B-IFDM can have the same total transmit power as that for an interlace of the B-IFDM satisfying a PSD limitation.

While a T-IFDM PRACH inside B-IFDM can fulfill the same OCB/PSD requirements and result in the same ZAZ as that of a B-IFDM PRACH of prior art, it can also provide additional advantages. For example, frequency-division multiplexing of multiple orthogonal PRACHs inside the interlace(s) allocated to PRACH can be easily performed.

Moreover, if other neighboring interlaces are allocated to a B-IFDM PUSCH/PUSCH with a SCS different from that used by the PRACH, several REs at the two ends of each block in the PRACH inter-lace(s) can be reserved as guard bands to avoid or mitigate interference with neighboring interlaces.

Figure 1A:
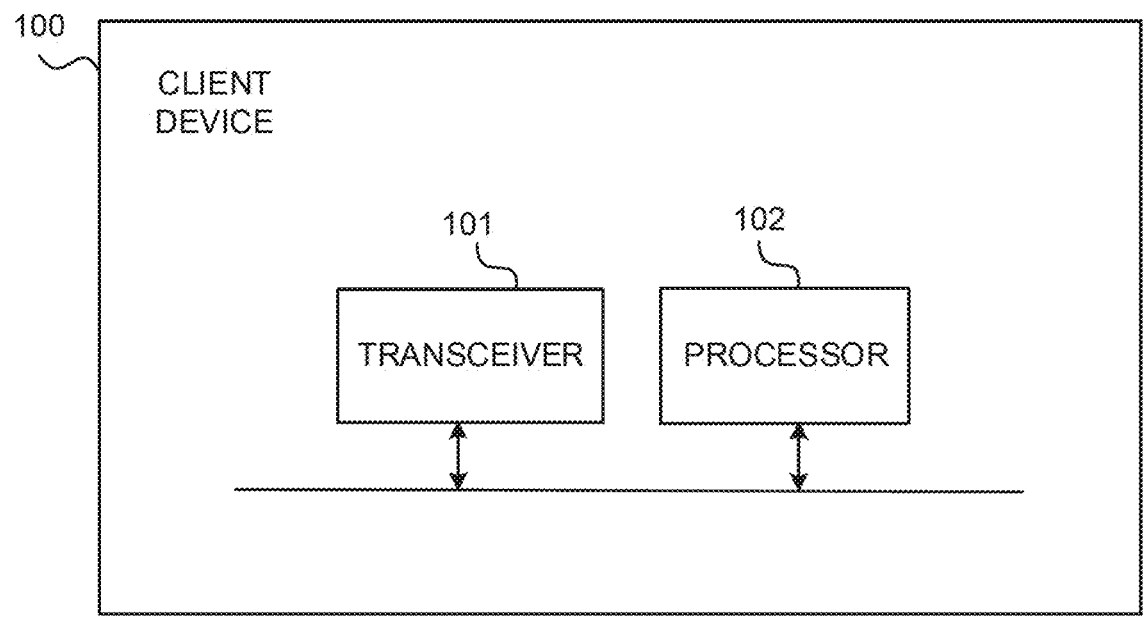
FIG. 1A is a block diagram illustrating a client device.
Figure 1B:
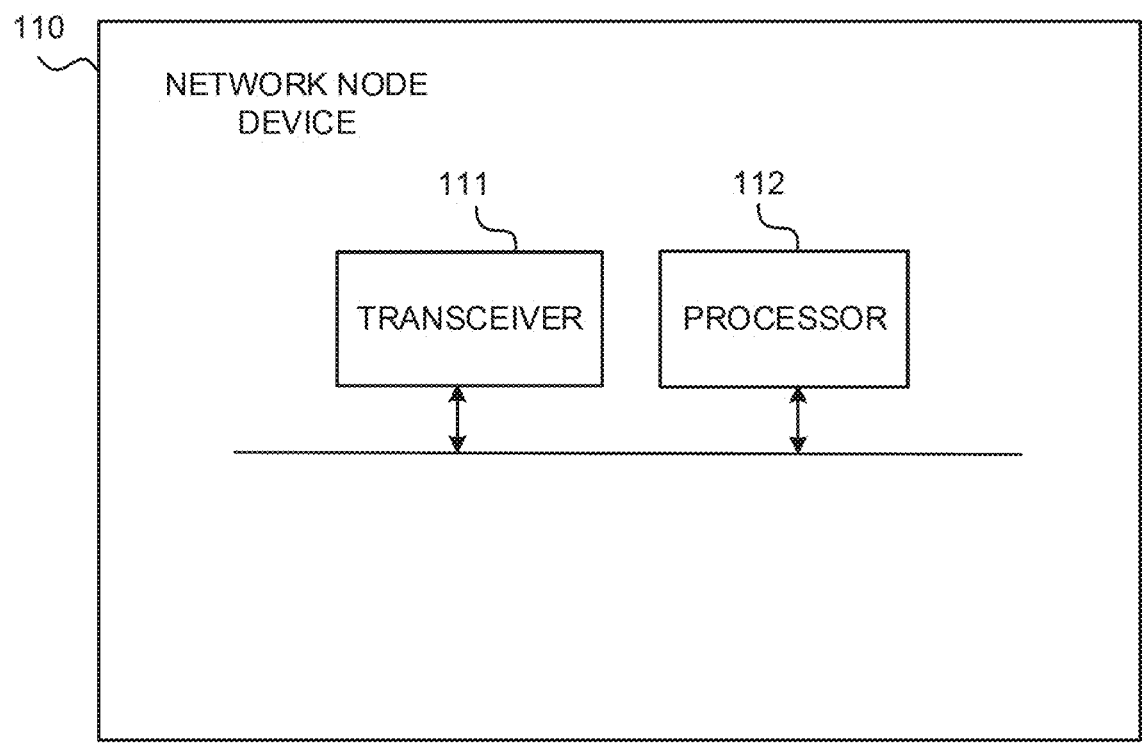
FIG. 1B is a block diagram illustrating a network node device.

Next, example embodiments of a client device 100 and a network node device 110 are described based on FIGS. 1A and 1B. Some of the features of the described devices are optional features which provide further advantages.

FIG. 1A is a block diagram that illustrates the client device 100. The client device 100 may be any of various types of devices used directly by an end user entity and capable of communication in a wireless network, such as a user equipment (UE). Such devices include but are not limited to smartphones, tablet computers, smart watches, lap top computers, Internet-of-Things (IoT) devices etc. Although embodiments may be described in terms of a client device, it is by way of example and in no way a limitation.

According to an aspect, the client device 100 may comprise a transceiver 101 and a processor or a processing unit 102 coupled to the transceiver 101, which may be used to implement the functionalities described below in more detail.

The processor 102 may include e.g. one or more of various processing devices, such as a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The client device 100 may further comprise a memory that is configured to store e.g. computer programs and the like. The memory may include one or more volatile memory devices, one or more non-volatile memory devices, and/or a combination of one or more volatile memory devices and non-volatile memory devices. For example, the memory may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

The transceiver 101 is configured to receive frequency resource information to indicate a set of frequency resources for a physical random access channel, PRACH, preamble transmission. In an example, the transceiver 101 may be configured to receive frequency resource information (e.g. by receiving a MIB (master information block)/SIB (system information block) or dedicated signalling from a network node device 110) to indicate a set of frequency resources for a PRACH preamble transmission in an unlicensed spectrum.

The received frequency resource information for indicating each frequency resource comprises any combination of an interlace information, a resource element allocation information and resource element spacing information.

The interlace information indicates at least one of an interlace of a block-interlaced frequency-division multiplexing, B-IFDM, allocation. The resource element allocation information indicates a subset of resource elements within each block of the at least one B-IFDM interlace. The resource element spacing information indicates resource element spacing. In an example, the interlace information may indicate at least one interlace of the B-IFDM allocation. For example, the subset of resource elements may comprise a set of subcarriers. Correspondingly, the resource element spacing may comprise subcarrier spacing. Herein, 'tone', 'resource element (RE)' and 'subcarrier' are used interchangeably.

Herein, the term 'interlace' is used to refer to a set of blocks uniformly distributed in a given frequency band, where each block comprises a same number of consecutive resource elements and the adjacent blocks in the interlace are spaced by a common number of blocks in the frequency domain. Consequently, multiple interlaces can be FDMed in a comb manner. In other words, the phrase 'an interlace of a block-interlaced frequency-division multiplexing, B-IFDM, allocation' refers to a sequence of blocks of used resource elements, obtained by interlacing blocks of used resource elements from multiple constituent sequences of blocks of used resource elements. Each constituent sequence of blocks of used resource elements consists of multiple blocks of used resource elements, where every two consecutive such blocks are separated by a constant number of unused resource elements.

An at least one resource element within at least one block of the at least one B-IFDM interlace is allocated for the transmission of one PRACH preamble according to a tone-interlaced frequency-division multiplexing, T-IFDM, allocation and the resource element allocation is repeated in each block of the at least one B-IFDM interlace. In an example, the indices of the subset of resource elements in each block are the same in all the blocks in the sense that they are repeated in all the blocks. In an example, an at least one resource element within each block of the at least one B-IFDM interlace may be allocated for the transmission of one PRACH preamble according to a tone-interlaced frequency-division multiplexing, T-IFDM, allocation and the resource element allocation may be repeated in each block of the at least one B-IFDM interlace.

In an example, each PRACH preamble transmission occupies one subset of resource elements. In other words, one subset of resource elements is allocated for the transmission of one PRACH preamble.

The client device 100 receives frequency resource information which can be used to indicate a set of frequency resources. Each frequency resource can be configured by three aspects of the information: A) interlace information, B) RE allocation information, and C) subcarrier spacing. Different frequency resources are distinguished by at least one of the A, B, and C. It is possible that all the frequency resources have the same information in one aspect, e.g. subcarrier spacing may be the same for all, and then this aspect of the frequency resource information may be common. The information used to configure each frequency resource may not be all from the received frequency resource information, e.g. SCS may be predetermined or carrier specific (e.g. once the client device 100 knows the carrier frequency, it knows the subcarrier spacing). Thus, the frequency resource information includes at least a portion of the three aspects of information used to define each frequency resource in the set.

In an example, for initial access, the client device 100 may be informed a set of frequency resources such that the client device 100 can randomly select one frequency resource from the set to transmit a PRACH preamble. For a connected case, the client device 100 may be informed only one frequency resource, and no random selection is performed at the client device 100.

The processor 102 is configured to select a frequency resource of the set of frequency resources based at least partially on the received frequency resource information, and to generate a PRACH preamble to be transmitted on the selected frequency resource.

The transceiver 101 is further configured to transmit the generated PRACH preamble on the selected frequency resource.

In an example, the blocks in each T-IFDM based PRACH allocation of the multiple T-IFDM based PRACH allocations may have the same frequency spacing.

In an example, multiple T-IFDM based PRACH allocations may be frequency-division multiplexed inside the at least one B-IFDM interlace.

In an example, at least one resource element in each block of the at least one B-IFDM interlace may be reserved. For example, the saved frequency resource in the PRACH interlace(s) can be reserved for providing guard bands which allows avoiding or mitigating interference between the PRACH preamble(s) and other channels in neighboring interlaces when used with different SCSs.

In an example, the distribution of the subset of resource elements within each block of the at least one B-IFDM interlace may be consecutive, non-consecutive and uniform, or non-uniform.

In an example, the at least one B-IFDM interlace may be indicated with a resource indication value, RIV, a bitmap, or an integer index.

In an implementation form of the first aspect, the subset of resource elements within each block of the at least one B-IFDM interlace may be indicated with a resource indication value, RIV, a bitmap or an integer index.

In an example, the processor 102 may be further configured to obtain a remaining part of the frequency resource information from data stored in the client device 100. Additionally or alternatively, a remaining part of the frequency resource information may comprise pre-determined information or carrier frequency-specific information.

FIG. 1B is a block diagram that illustrates a network node device 110. The network node device 110 may include e.g. a base station, such as a macro-eNodeB, a pico-eNodeB, a home eNodeB, a fifth-generation base station (gNB) or any such device providing an air inter-face for client devices (including e.g. the client device 100 of FIG. 1A) to connect to the wireless network via wireless transmissions.

According to an aspect, the network node device 110 comprises a transceiver 111 and a processor or a processing unit 112 coupled to the transceiver 111, which may be used to implement the functionalities described later in more detail.

The processor 112 may include e.g. one or more of various processing devices, such as a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The network node device 110 may further comprise a memory that is configured to store, e.g., computer programs and the like. The memory may include one or more volatile memory devices, one or more non-volatile memory devices, and/or a combination of one or more volatile memory devices and non-volatile memory devices. For example, the memory may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

It is to be noted that the various parameters and pieces of data used by the network node device 110 are identical or at least functionally equivalent to those used by the client device 100 so their descriptions are not repeated here in detail.

The transceiver 111 is configured to transmit frequency resource information to indicate a set of frequency resources for physical random access channel, PRACH, preamble transmission. The transmitted frequency resource information for indicating each frequency resource comprising at least one of an interlace information indicating at least one of an interlace of a block-interlaced frequency-division multiplexing, B-IFDM, allocation, a resource element allocation information indicating a subset of resource elements within each block of the at least one B-IFDM interlace, and a resource element spacing information.

An at least one resource element within at least one block of the at least one B-IFDM interlace is allocated for the transmission of one PRACH preamble according to a tone-interlaced frequency-division multiplexing, T-IFDM, allocation and the resource element allocation is repeated in each block of the at least one B-IFDM interlace.

The transceiver 111 is further configured to receive a signal comprising at least one PRACH preamble, each of the at least one PRACH preambles transmitted on one frequency resource of the indicated set of frequency resources.

The processor 112 is configured to derive at least one index from the received signal, each derived index corresponding to one of the PRACH preambles contained in the received signal. As a result, the network node device 110 is made aware of the existence and timing advance of a client device 100, such that an uplink connection between the client device 100 and the network node device 110 can be established.

In an example, at least two PRACH preambles are transmitted (by different client devices) on the same frequency resource of the indicated set of frequency resource, where they can be distinguished e.g. by using different ZC sequences with different root indexes to guar-antee low cross correlation, as discussed below in more detail. Additionally or alternatively, at least two PRACH preambles can also be transmitted on different frequency resources of the indicated set of frequency resources (e.g. they are FDMed).

For the network node device 110, the frequency resource information may be broadcast to multiple client devices 100 and each client device 100 may transmit a PRACH preamble based on the received frequency resource information and random selection simultaneously.

Figure 2A:
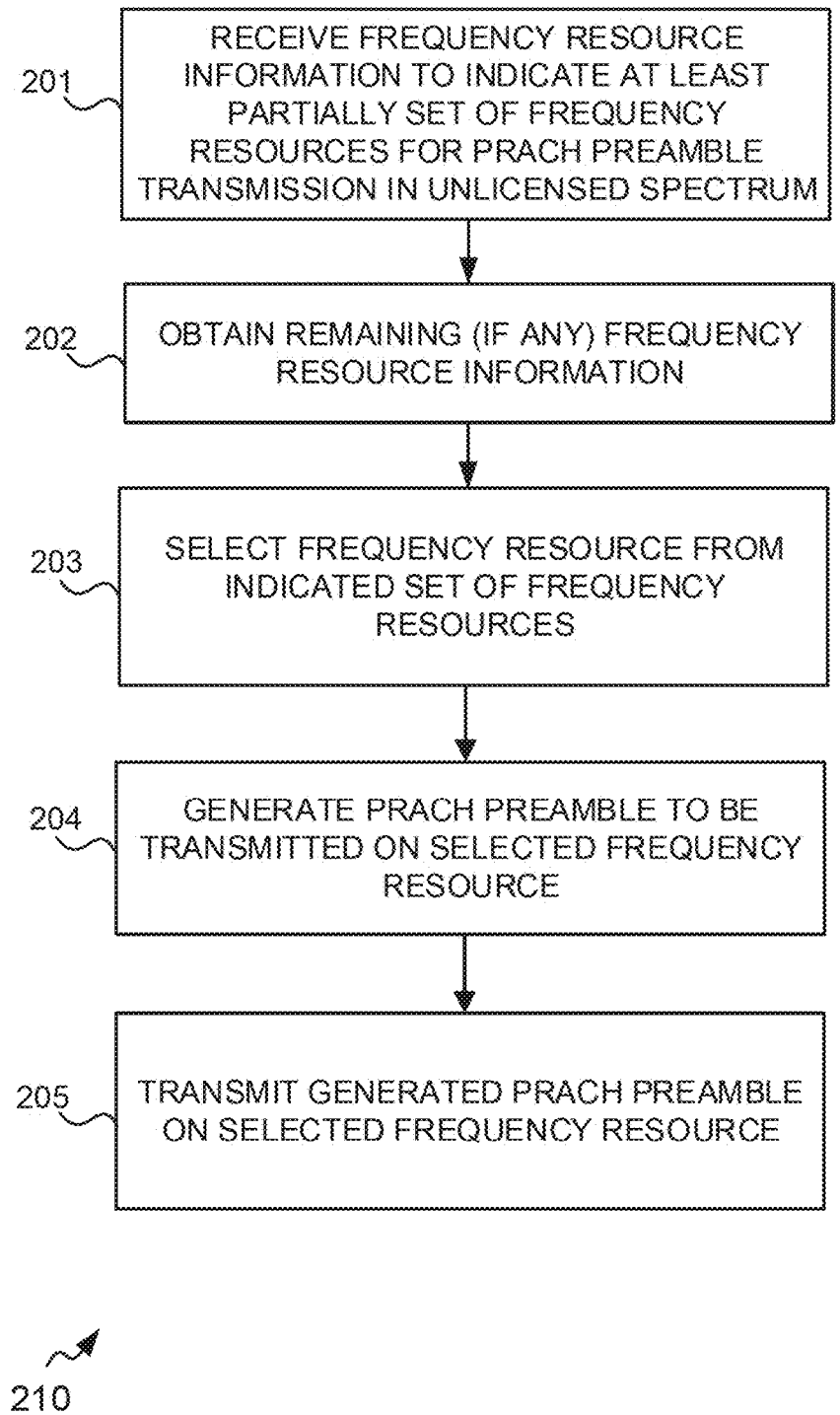
FIG. 2A is a flow diagram illustrating a method.

FIG. 2A is a flow diagram illustrating a method 210 according to an embodiment.

At operation 201, frequency resource information to indicate a set of frequency resources for a physical random access channel, PRACH, preamble transmission is received by a transceiver in a client device for wireless communication. The received frequency resource information for indicating each frequency resource comprises at least one of: an interlace information indicating at least one of an interlace of a block-interlaced frequency-division multiplexing, B-IFDM, allocation, a resource element allocation information indicating a subset of resource elements within each block of the at least one B-IFDM interlace, and a resource element spacing information, such that an at least one resource element within at least one block of the at least one B-IFDM interlace is allocated for the transmission of one PRACH preamble according to a tone-interlaced frequency-division multiplexing, T-IFDM, allocation and the resource element allocation is repeated in each block of the at least one B-IFDM interlace.

At optional operation 202, a remaining part of the frequency resource information (if any) may be obtained by the processor from data stored in the client device. The remaining part of the frequency resource information may also comprise e.g. pre-determined information or carrier frequency-specific information.

At operation 203, a frequency resource of the set of frequency resources is selected by a processor in the client device, based at least partially on the received frequency resource information.

At operation 204, a PRACH preamble to be transmitted on the selected frequency resource is generated by the processor in the client device.

At operation 205, the generated PRACH preamble is transmitted by the transceiver in the client device on the selected frequency resource.

The method 210 may be performed by the client device 100. Further features of the method 210 directly result from the functionalities of the client device 100. The method 210 can be performed by a computer program.

Figure 2B:
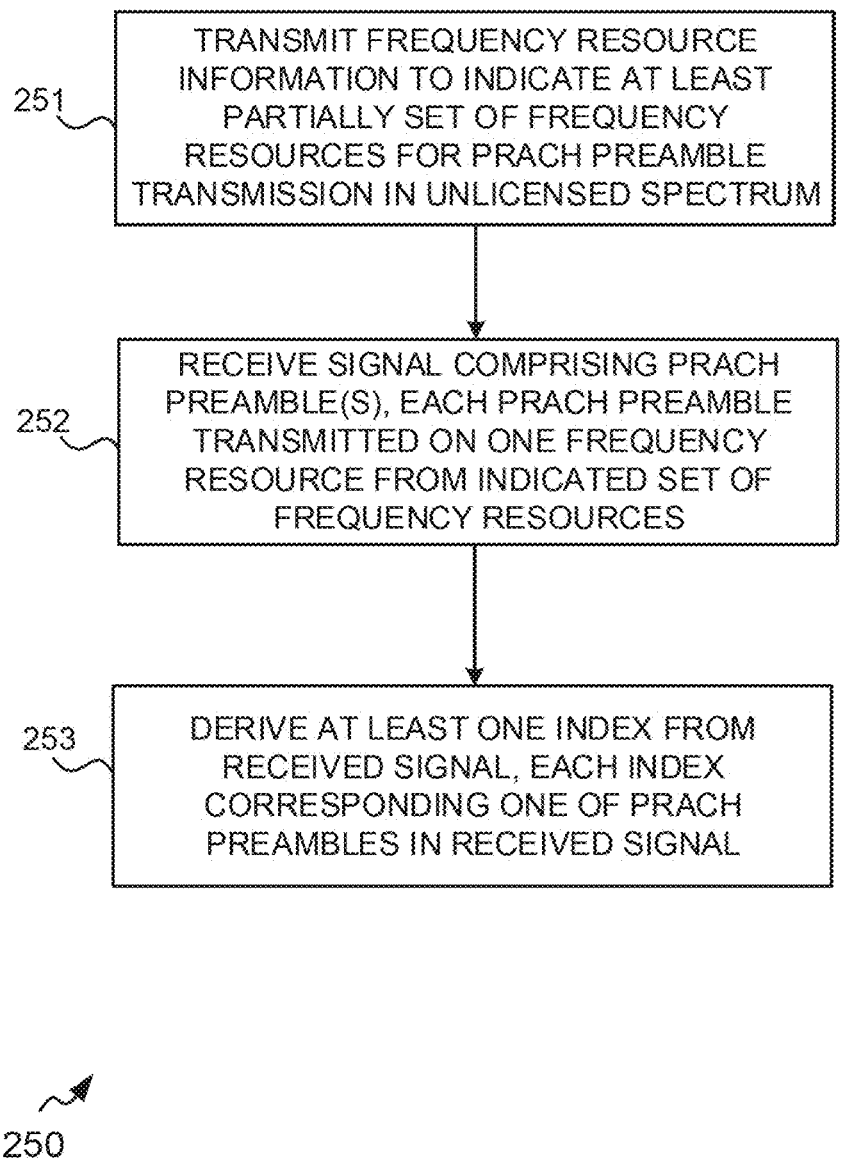
FIG. 2B is another flow diagram illustrating a method.

FIG. 2B is a flow diagram illustrating a method 250 according to an embodiment.

At operation 251, frequency resource information to indicate a set of frequency resources for physical random access channel, PRACH, preamble transmission is transmitted by a transceiver in a network node device for wireless communication. The transmitted frequency resource information for indicating each frequency resource comprising at least one of: an interlace information indicating at least one of an interlace of a block-interlaced frequency-division multiplexing, B-IFDM, allocation, a resource element allocation information indicating a subset of resource elements within each block of the at least one B-IFDM interlace, and a resource element spacing information, such that an at least one resource element within at least one block of the at least one B-IFDM interlace is allocated for the transmission of one PRACH preamble according to a tone-interlaced frequency-division multiplexing, T-IFDM, allocation and the resource element allocation is repeated in each block of the at least one B-IFDM interlace.

At operation 252, a signal comprising at least one PRACH preamble is received by the transceiver in the network node device. Each of the at least one PRACH preambles is transmitted on one frequency resource of the indicated set of frequency resources.

At operation 253, at least one index is derived from the received signal by a processor in the network node device. Each derived index corresponds to one of the PRACH preambles contained in the received signal.

The method 250 may be performed by the network node device 110. Further features of the method 250 directly result from the functionalities of the network node device 110. The method 250 can be performed by a computer program.

In the following, further examples of the embodiments of FIGS. 1A to 2B are discussed based on FIGS. 4A to 5D.

In a first further example (FIGS. 4A to 4D), several T-IFDM PRACH allocations are permitted inside the B-IFDM where each T-IFDM PRACH is defined by a non-overlapping subset of tone indexes in each block of the B-IFDM interlace(s) allocated to PRACH, and the number of tone indexes in each of these non-overlapping subsets is at least one. For example, the number of tone indexes in each block of one T-IFDM PRACH may be less than the maximum number of tone indexes in a block of the interlace(s). It follows that the blocks in each T-IFDM allocation have the same frequency spacing, which results in different orthogonal PRACH preambles with the same autocorrelation profile, and which will thus provide the same timing estimation capability. As a result, the client device 100 may be granted by the network node device 110 the possibility to randomly pick up one of these T-IFDM PRACH allocations to construct its PRACH preamble. This increases the PRACH orthogonal multiplexing capacity compared to B-IFDM PRACH in prior art.

Figure 4A:
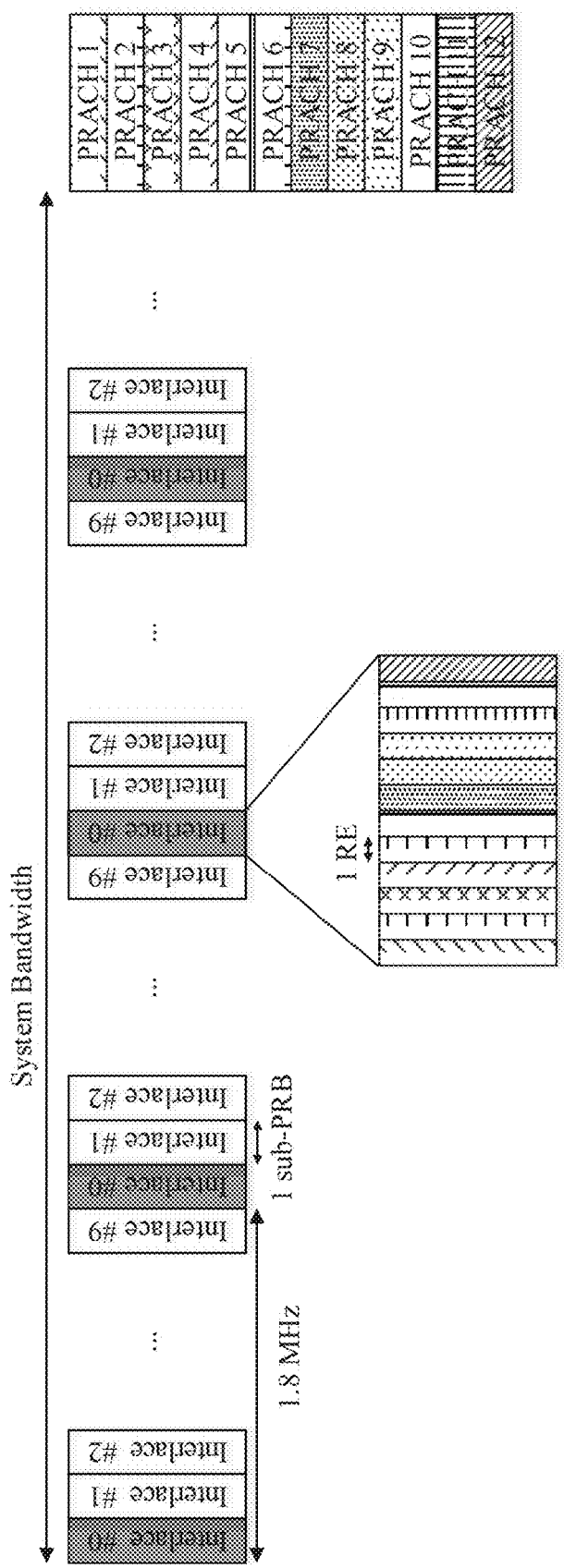
FIG. 4A is a diagram illustrating frequency-division multiplexing (FDM) of 12 tone-interlaced frequency-division multiplexing (T-IFDM) physical random access channels (PRACHs) inside a B-IFDM interlace distributed every 10th PRB of 15 kHz SCS.

Diagram 410 of FIG. 4A illustrates twelve multiplexed T-IFDM PRACHs inside a single interlace of the B-IFDM design of LTE LAA of FIG. 3A. Here, each T-IFDM PRACH comprises one RE in each of the 10 blocks of the interlace, and so has 10 REs in total. Consequently, sequences of length of about 10 (e.g. Zadoff-Chu (ZC) sequences or shortened ZC sequences with different root indexes) are used by allocating the 10 elements of each sequence to the 10 REs of a T-IFDM PRACH. Here, the same ZC sequence can be reused in different T-IFDM PRACHs as they are FDMed and orthogonal to each other, and ZC sequences with different root indexes can be used in the same T-IFDM PRACH in a CDM manner as long as low cross correlation between them can be guaranteed.

It is to be noted that the 10 REs allocated to each T-IFDM PRACH are equally spaced in the frequency domain with the same frequency spacing of 1.8 MHz as that for B-IFDM. It then follows that the time span of the ZAZ of the PRACH preambles is totally determined by this frequency spacing of 1.8 MHz and leads to a ZAZ time span of 1/(1.8 MHz)≈0.5 μs. In addition, the equal spacing between REs of each T-IDFM PRACH also guarantees that the peak-to-average power ratio (PAPR) of the generated PRACH preamble waveform is as low as that achieved with consecutive RE allocation. It is to be noted that with this equal spacing property, the use of a common ZC sequence with different cyclic shifts CDMed in the T-IFDM PRACH will lead to a reduced zero cross-correlation zone between them and in turn to a reduced cell radius that can be supported. Hence, the use of a common ZC sequence with different cyclic shifts CDMed in the T-IFDM PRACH may take into account the expected cell radius to be supported.

Figure 4B:
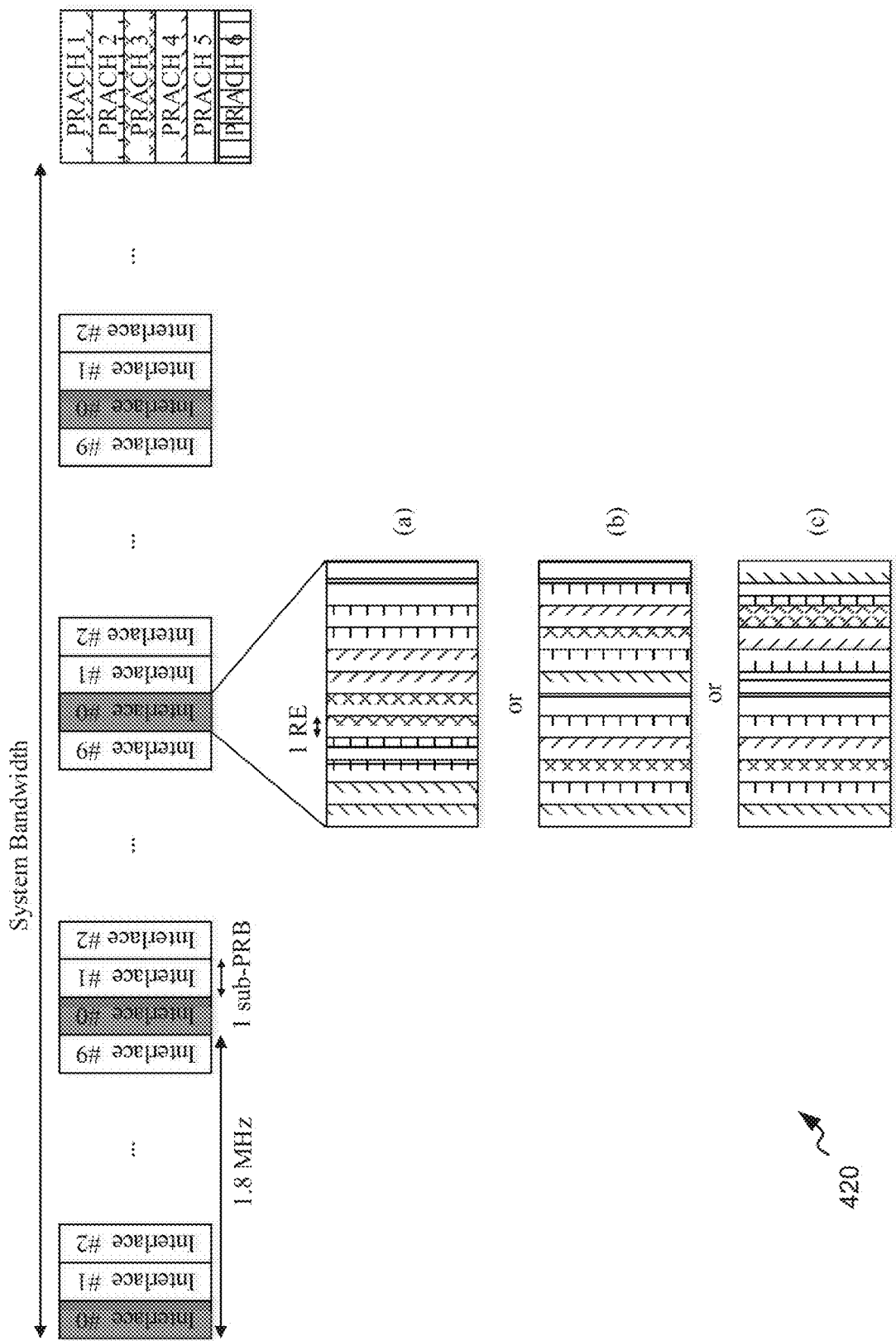
FIG. 4B is a diagram illustrating FDM of 6 T-IFDM PRACH inside a B-IFDM interlace distributed every 10th PRB of 15 kHz SCS.
Figure 4C:
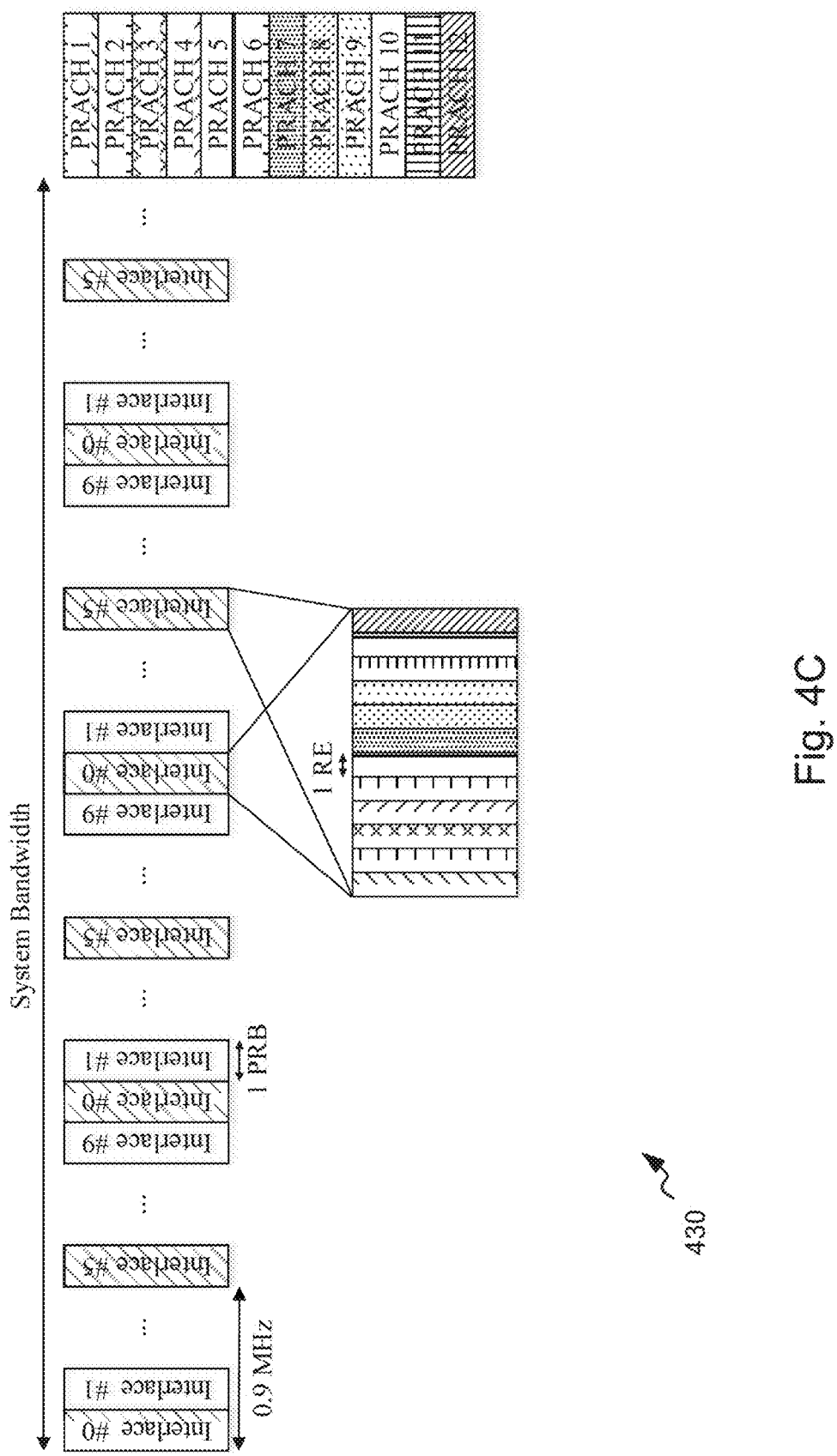
FIG. 4C is a diagram illustrating FDM of 12 T-IFDM PRACH inside two equally spaced B-IFDM interlaces where each interlace is distributed every 10th PRB of 15 kHz SCS.
Figure 4D:
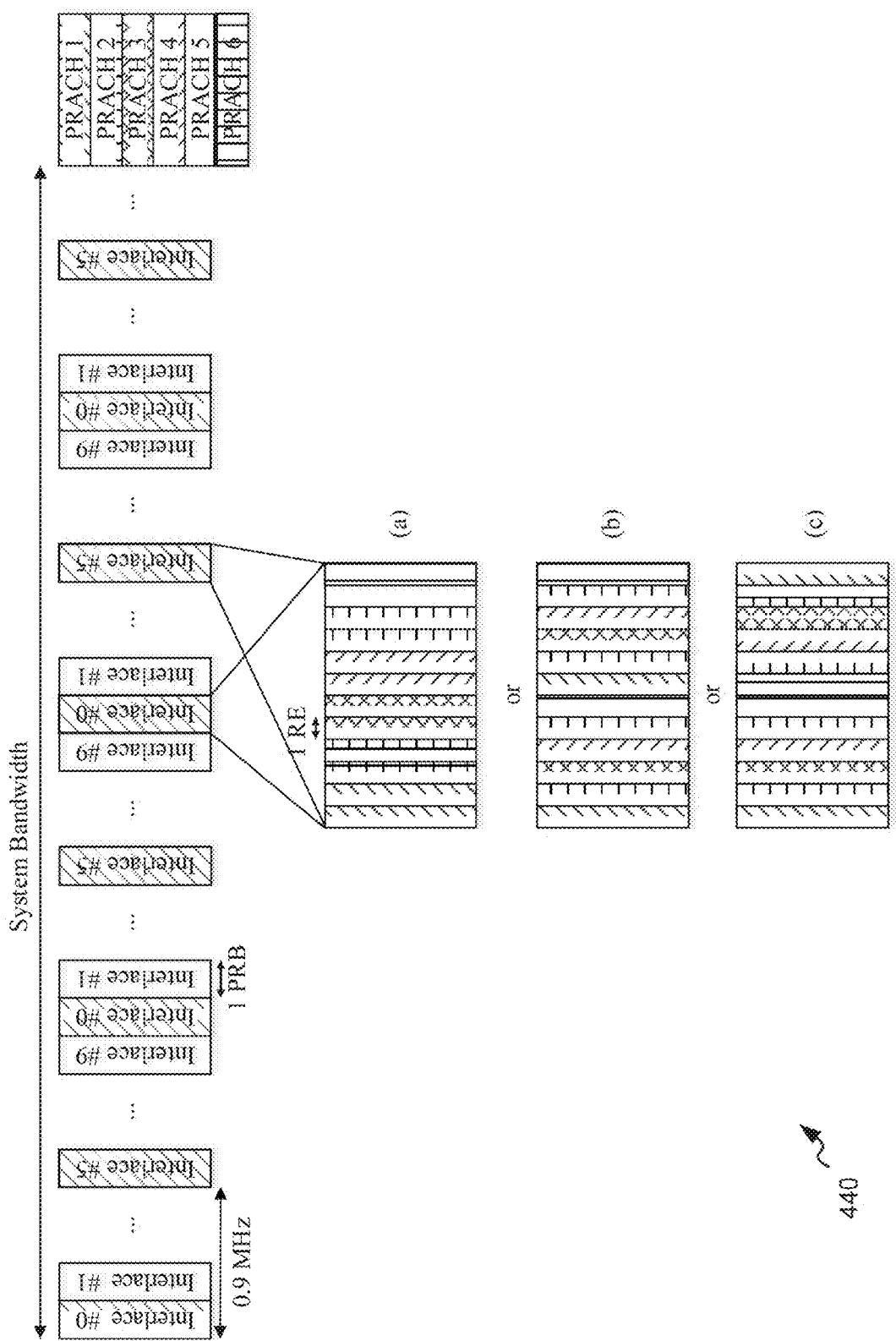
FIG. 4D is a diagram illustrating FDM of 6 T-IFDM PRACH inside two B-IFDM interlaces where each interlace is distributed every 10th PRB of 15 kHz SCS.

If a longer PRACH sequence is to be used, diagram 420 of FIG. 4B illustrates six FDMed T-IFDM PRACHs inside a single interlace of the B-IFDM design of LTE LAA of FIG. 3A, where each T-IFDM PRACH comprises two REs (not necessarily consecutive as in FIG. 4B) in each of the 10 blocks and so has 20 REs in total. Consequently, sequences of length of about 20 (e.g. ZC sequences or shortened ZC sequences with different root indexes and/or cyclic shifts) can be used. The blocks of REs allocated to each T-IFDM PRACH have the same frequency spacing of 1.8 MHz as for B-IFDM. It follows again that the time span of the ZAZ of the PRACH preamble is determined by this frequency spacing of 1.8 MHz and leads to a ZAZ time span of 1/(1.8 MHz) 0.5 is. It is to be noted that for each T-IFDM PRACH, the two REs in each block can be either consecutive (e.g. the pattern (a)) or non-consecutive (e.g. the patterns (b) and (c)), and their positions relative to different FDMed T-IFDM PRACHs can be either uniform (e.g. the patterns (a) and (b)) or non-uniform (e.g. the pattern (c)). An advantage of consecutive RE allocation pattern(s) and non-uniform RE allocation pattern(s) is that the cross-talk phenomenon between FDMed T-IFDM PRACHs in the system with carrier frequency offset can be mitigated or avoided to an extent, i.e. the probability of falsely detecting a T-IFDM PRACH as its FDMed version can be reduced even with carrier frequency offset. In addition, in any RE allocation patterns not limited to the above three examples (a), (b) and (c), these 20 REs are not uniformly spaced in the frequency domain, and so a common ZC sequence with different cyclic shifts may be CDMed in the same T-IFDM PRACH without leading to a reduced supported cell radius when low cross correlation between them can be arranged.

Meanwhile, if a larger ZAZ time span is expected, two equally spaced B-IFDM interlaces may be allocated to PRACH with one tone per PRB of each interlace. In this case, each T-IFDM PRACH comprises one RE in each of the 20 blocks and so has 20 REs in total. Consequently, sequences of length of about 20 (e.g. ZC sequences or shortened ZC sequences with different root indexes) can be used. The REs of each T-IFDM PRACH now have a frequency spacing of 0.9 MHz as shown in diagram 430 of FIG. 4C, which results in a ZAZ time span of 1/(0.9 MHz) 1.1 μs and inherits the same PAPR of the same PRACH sequence with consecutive RE allocation.

Similarly, if even longer sequences are to be used, multiple tones (e.g. 2) per PRB of two equally spaced B-IFDM interlaces may be allocated to a T-IFDM PRACH. In this case, sequences of about 40 REs (e.g. ZC sequences or shortened ZC sequences with different root indexes and/or cyclic shifts) are applicable. Again, the REs of each T-IFDM PRACH have a frequency spacing of 0.9 MHz as shown in diagram 440 of FIG. 4D, which leads to a ZAZ time span of 1/(0.9 MHz) 1.1 μs.

For example, when four T-IFDM PRACHs are FDMed inside at least one interlace of the B-IFDM design of LTE LAA of FIG. 3A and each T-IFDM PRACH occupies 3 REs per PRB of 12 REs indexing from 0 to 11, the RE allocation within each PRB for the four FDMed T-IFDM PRACHs can be consecutive, non-consecutive and uniform, or non-uniform. For example, with consecutive RE allocation, the indexes of REs in each PRB allocated to one PRACH can form one of the sets {0, 1, 2}, {3, 4, 5}, {6, 7, 8} and {9, 10, 11}. With non-consecutive and uniform RE allocation, the indexes of REs in each PRB allocated to one PRACH can form one of the sets {0, 4, 8}, {1, 5, 9}, {2, 6, 10} and {3, 7, 11}. With non-uniform RE allocation, the indexes of REs in each PRB allocated to one PRACH can form one of the sets {0, 1, 10}, {2, 6, 9}, {3, 5, 11} and {4, 7, 8}.

For example, when three T-IFDM PRACHs are FDMed inside at least one interlace of the B-IFDM design of LTE LAA of FIG. 3A and each T-IFDM PRACH occupies 4 REs per PRB of 12 REs indexing from 0 to 11, the RE allocation within each PRB for the three FDMed T-IFDM PRACHs can be consecutive, non-consecutive and uniform, or non-uniform. For example, with consecutive RE allocation, the indexes of REs in each PRB allocated to one PRACH can form one of the sets {0, 1, 2, 3}, {4, 5, 6, 7} and {8, 9, 10, 11}. With non-consecutive and uniform RE allocation, the indexes of REs in each PRB allocated to one PRACH can form one of the sets {0, 3, 6, 9}, {1, 4, 7, 10} and {2, 5, 8, 11}. With non-uniform RE allocation, the indexes of REs in each PRB allocated to one PRACH can form one of the sets {0, 1, 3, 6}, {2, 4, 7, 11} and {5, 8, 9, 10}.

In a second further example (FIGS. 5A to 5D), one or multiple T-IFDM PRACH allocations are permitted inside the B-IFDM, where each T-IFDM PRACH is defined from a non-overlapping subset of tone indexes in each block of a B-IFDM interlace, and the number of tone indexes in each of these non-overlapping subsets is at least one. In addition, if PRACH and other neighboring channels in B-IFDM (e.g.

PUSCH/PUCCH) have different SCSs (which is possible with NR), tone allocation of T-IFDM PRACHs may be done in the middle of the blocks so that other tones/REs at the two ends of each block of T-IFDM PRACHs may be reserved as guard tones to avoid or mitigate interference with neighboring channels.

For example, the NR PRACH sequences with lengths of 139 and 15 kHz SCS may be reused, which are allocated in two equally spaced B-IFDM interlaces, i.e. 20 blocks in total with frequency spacing of 0.9 MHz. In each of these 20 blocks, the seven most middle tones may be allocated for PRACH transmission, and the rest of the tones in each block may be kept unused serving as guard tones to avoid or mitigate interference with neighboring channels.

Figure 5A:
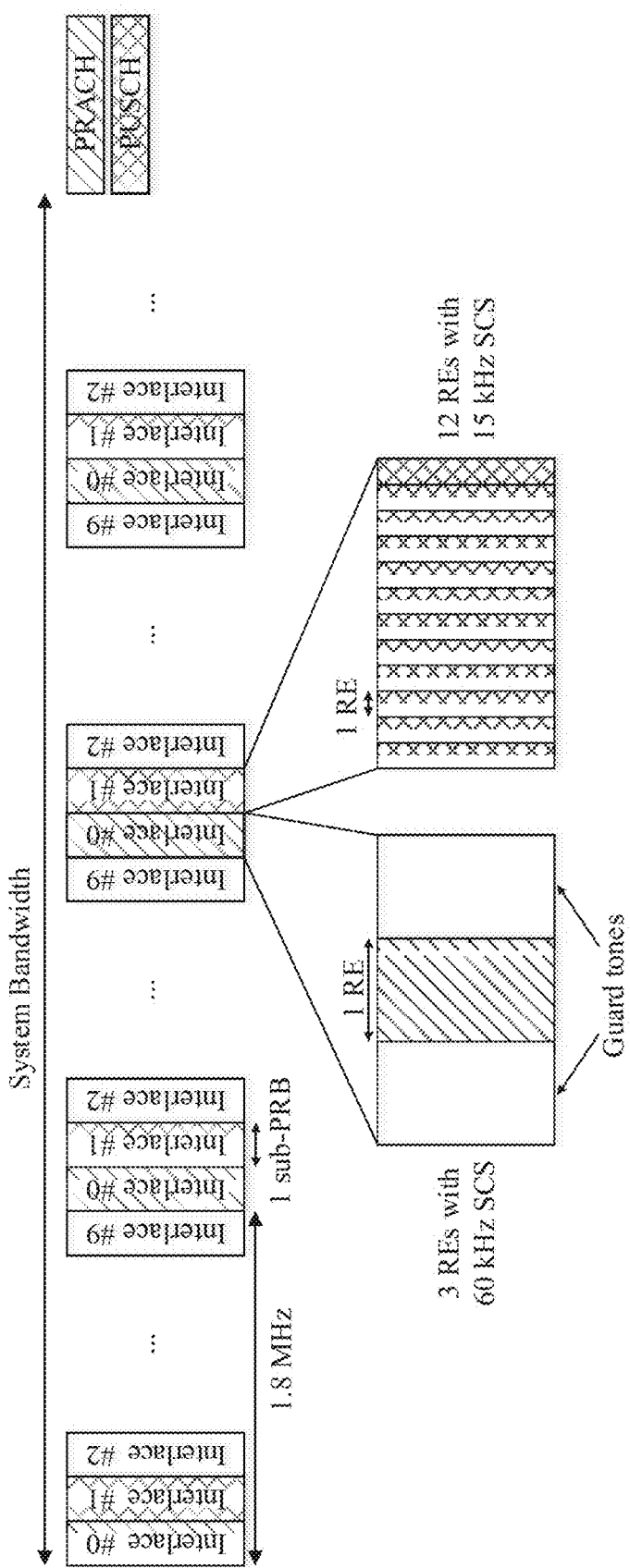
FIG. 5A is a diagram illustrating allocation of a single T-IFDM PRACH in the middle tone of a B-IFDM interlace with guard tones at the two ends of the block to avoid/mitigate interference with neighboring B-IFDM with different SCS.

In diagram 510 of FIG. 5A, a single T-IFDM PRACH is allocated in the middle tone of each block of a B-IFDM interlace, where each block is a sub-PRB of 3 REs with 60 kHz SCS. The other two tones at the two ends of each block are kept unused, such that they can serve as guard tones to avoid interference with neighboring B-IFDM PUSCH interlaces in which each block is a PRB of 12 REs with 15 kHz SCS.

Figure 5B:
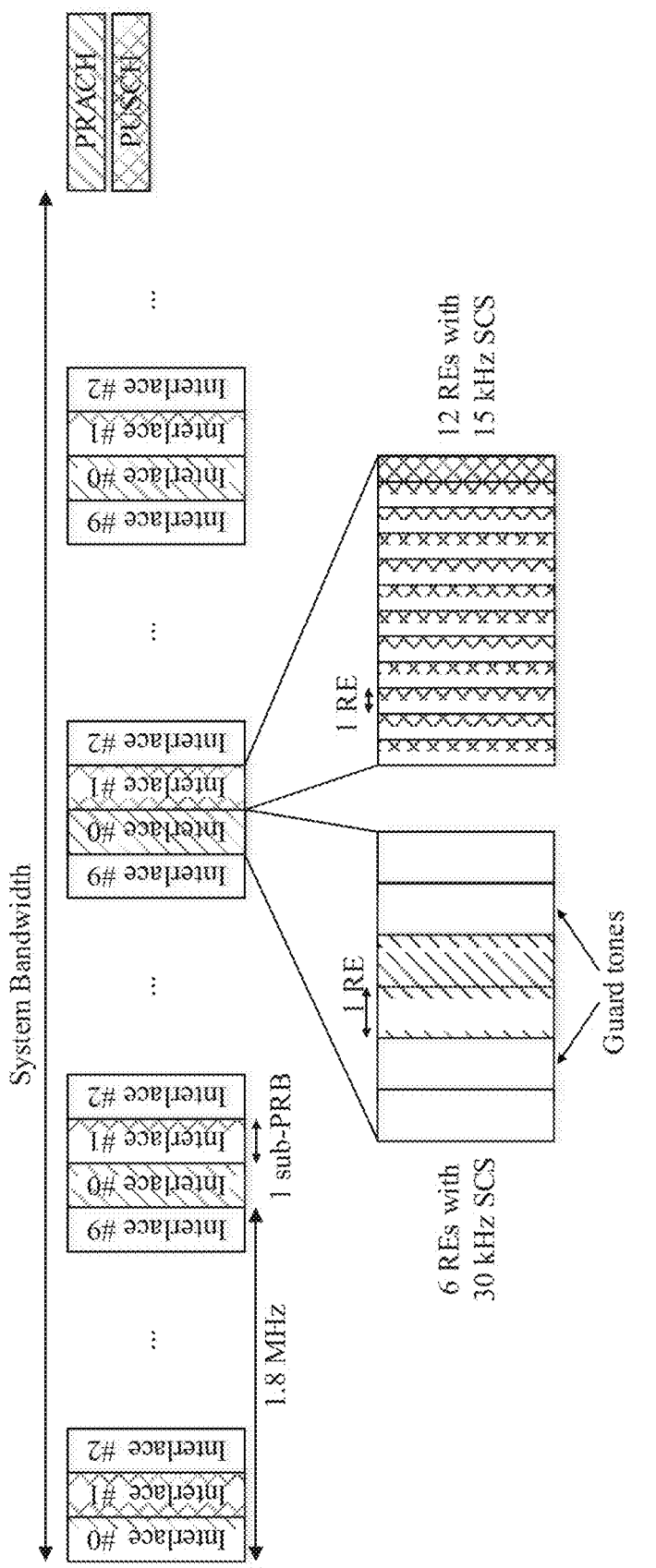
FIG. 5B is a diagram illustrating allocation of a single T-IFDM PRACH in the middle two tones of a B-IFDM interlace with guard tones at the two ends of the block to avoid/mitigate interference with neighboring B-IFDM with different SCS.
Figure 5C:
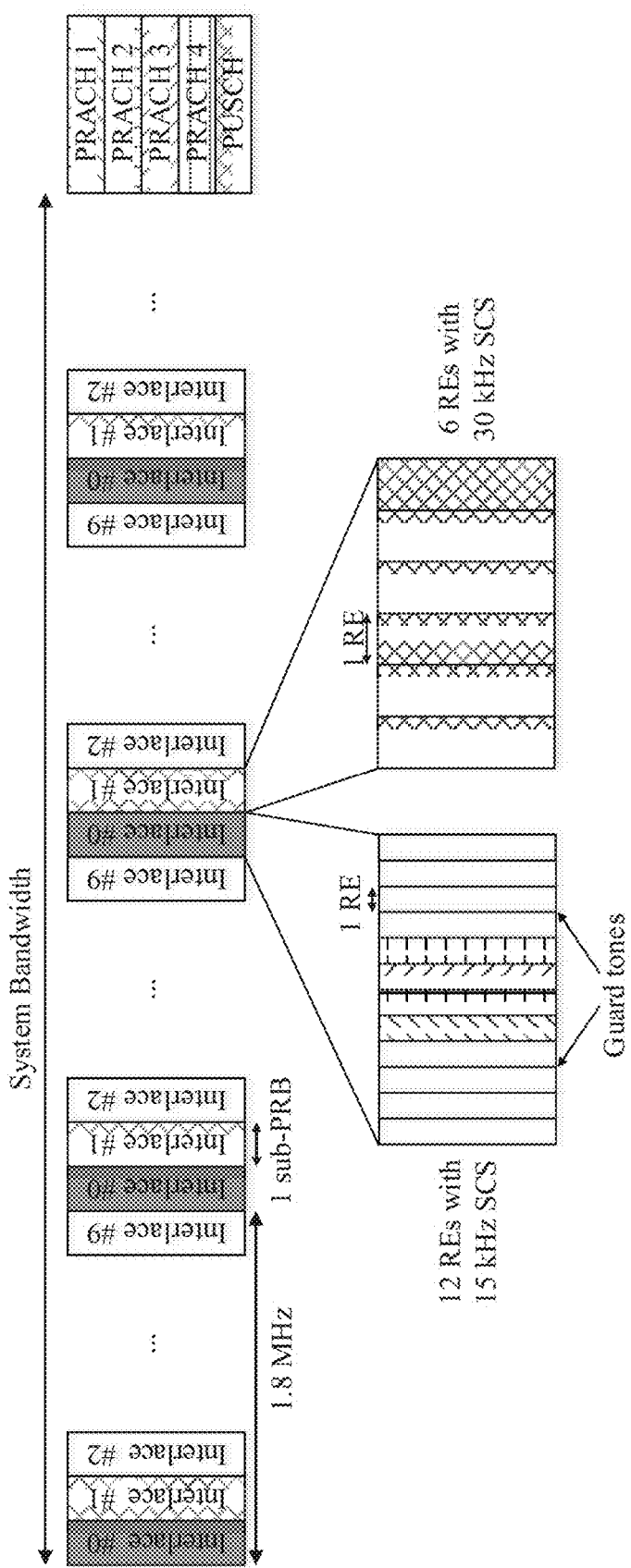
FIG. 5C is a diagram illustrating FDM of 4 T-IFDM PRACHs in the 4 middle tones of a B-IFDM interlace such that there are 4 guard tones at each end of the block to avoid/mitigate interference with neighboring B-IFDM with different SCS.

In diagram 520 of FIG. 5B, a single T-IFDM PRACH is allocated in several middle tones of each block of a B-IFDM interlace, where each block is a sub-PRB of 6 REs with 30 kHz SCS. The rest of the tones at the two ends of the block are then kept unused, such that they can serve as guard tones to avoid interference with neighboring B-IFDM PUSCH interlaces where blocks are PRB of 12 REs with 15 kHz SCS.

Depending on the OFDM numerology used for PRACH, multiple T-IFDM PRACHs may be multiplexed inside one or multiple equally spaced B-IFDM interlace(s) while maintaining guard tones. In diagram 530 of FIG. 5C, four T-IFDM PRACHs are allocated in the four most middle tones of a B-IFDM interlace where each block is a PRB of 12 REs with 15 kHz SCS. As a result, there are four unused tones serving as guard tones at each end of the block to avoid interference with neighboring B-IFDM PUSCH interlaces in which each block is a sub-PRB of 6 REs with 30 kHz SCS.

Figure 5D:
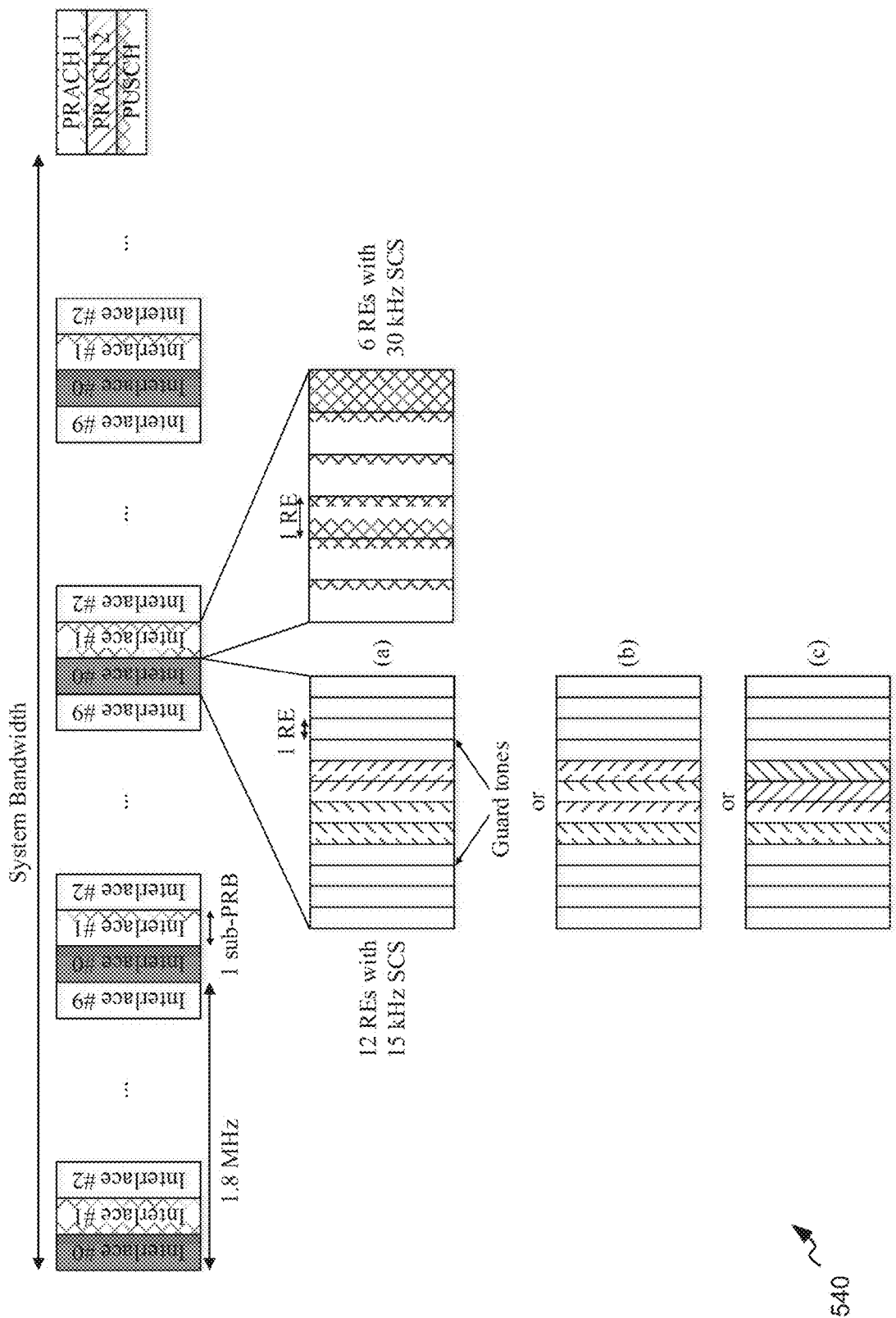
FIG. 5D is a diagram illustrating FDM of 2 T-IFDM PRACHs in the 4 middle tones, each occupying two tones, of a B-IFDM interlace such that there are 4 guard tones at each end of the block to avoid/mitigate interference with neighboring B-IFDM with different SCS.

In diagram 540 of FIG. 5D, two T-IFDM PRACHs are allocated in the four most middle tones, each occupying 2 tones, of a B-IFDM interlace where each block is a PRB of 12 REs with 15 kHz SCS. As a result, there are four unused tones serving as guard tones at each end of the block to avoid interference with neighboring B-IFDM PUSCH interlaces in which each block is a sub-PRB of 6 REs with 30 kHz SCS.

For example, when three T-IFDM PRACHs are FDMed inside at least one interlace of the B-IFDM design of LTE LAA of FIG. 3A and each T-IFDM PRACH occupies 3 REs per PRB of 12 REs indexing from 0 to 11, the RE allocation within each PRB for the three FDMed T-IFDM PRACHs can be consecutive, non-consecutive and uniform, or non-uniform. For example, with consecutive RE allocation, the indices of REs in each PRB allocated to one PRACH can form one of the sets {1, 2, 3}, {4, 5, 6} and {7, 8, 9}. With non-consecutive and uniform RE allocation, the indices of REs in each PRB allocated to one PRACH can form one of the sets {1, 4, 7}, {2, 5, 8} and {3, 6, 9}. With non-uniform RE allocation, the indices of REs in each PRB allocated to one PRACH can form one of the sets {1, 2, 9}, {3, 5, 10} and {4, 7, 8}. For all these RE allocations, at least one RE at each end of each PRB allocated to PRACH is reserved as guard REs to avoid/mitigate interference with neighboring B-IFDM with different SCS.

For example, when two T-IFDM PRACHs are FDMed inside at least one interlace of the B-IFDM design of LTE LAA of FIG. 3A and each T-IFDM PRACH occupies 4 REs per PRB of 12 REs indexing from 0 to 11, the RE allocation within each PRB for the two FDMed T-IFDM PRACHs can be consecutive, non-consecutive and uniform, or non-uniform. For example, with consecutive RE allocation, the indices of REs in each PRB allocated to one PRACH can form one of the sets {2, 3, 4, 5} and {6, 7, 8, 9}. With non-consecutive and uniform RE allocation, the indices of REs in each PRB allocated to one PRACH can form one of the sets {2, 4, 6, 8} and {3, 5, 7, 9}. With non-uniform RE allocation, the indices of REs in each PRB allocated to one PRACH can form one of the sets {1, 2, 3, 6} and {4, 7, 9, 10}. For all these RE allocations, at least one RE at each end of each PRB allocated to PRACH is reserved as guard REs to avoid/mitigate interference with neighboring B-IFDM with different SCS.

In the following, further examples of signaling of PRACH resources are discussed.

The client device 100 is informed about the frequency resources on which the PRACH preamble may be transmitted. For initial access, such information may be provided through broadcast signaling (e.g. a physical broadcast channel) in a master information block (MIB) or through system information (e.g. by RRC signaling which is transmitted through a physical downlink shared channel) in a system information block (SIB). For a connected client device 100, where random access can be used for other purposes (such as handover, beam failure recovery etc.) such information may be provided by dedicated signaling (e.g. client device 100 specific RRC signaling).

For initial access, a set of resources is provided and the client device 100 may randomly select resources (i.e. the REs/subcarriers within the PRB-interlace(s) and/or the sub-PRB-interlace(s)) used for transmitting the PRACH preamble. When the PRACH preamble is used for other purposes, a set of resources which is different from the ones for initial access can be provided. In this case, random selection may not be used and the client device 100 may be provided with the assigned resource directly.

The provided information may include one or several of the following entities.

For initial access, the B-IFDM interlace(s) for PRACH may be located within a bandwidth part of the carrier which is designated for initial access. The information of the bandwidth part (e.g. the location and bandwidth) may be provided in the system information. If the client device 100 is configured with additional bandwidth parts in which PRACH may be transmitted (e.g. for other purposes than initial access), these bandwidth parts may be configured after the initial access has been completed.

In an example, REs from one B-IFDM interlace are utilized for PRACH transmission and the allocated interlace is informed to the client device 100. In another example, REs from more than one B-IFDM interlace are utilized for PRACH transmission and the allocated interlaces are informed to the client device 100.

The following discusses examples for encoding the information of one or several B-IFDM interlaces.

Resource indication value (RIV): an advantage of allocating consecutive interlaces is that the corresponding signaling can be made efficient requiring fewer bits. The information of the B-IFDM interlaces may be provided by an integer index (i.e. the resource indication value (RIV)), as follows:

The set of allocated resource blocks in the interlace is $PRB_{START}+l+i \cdot N$, where N is the inter-PRB spacing, PRB START is the starting PRB, $i=0, 1, \ldots, N_{MAX}-1$ and $l=0$, 1, . . . , L−1, with $N_{MAX}$ being the number of PRB clusters in the interlace and L being the number of contiguously allocated interlaces. The resource indication value is defined by:

$$\begin{aligned}&\text{if } (L-1) \leq \lfloor N/2 \rfloor \text{ then}\\&\qquad \text{RIV}=N(L-1)+\text{PRB}_{START}\\&\text{else}\\&\qquad \text{RIV}=N(N-L+1)+(N-1-\text{PRB}_{START})\end{aligned}$$

When N is known, L and $\text{PRB}_{START}$ can be uniquely determined from the RIV.

In an example, only the RIV is signaled to the client device 100.

In another example, at least one of N and L is signaled together with the RIV.

In yet another example, at least one of N and L is predetermined or is a function of other parameter values, e.g., carrier bandwidth, the associated carrier bandwidth part, the subcarrier spacing, or the like. This is advantageous as it reduces the amount of signaling.

For random access, it may be possible to allocate more than one PRB interlace (i.e. L>1) and let the client device 100 randomly choose at least one of the interlaces.

Bitmap: the information of the B-IFDM interlaces may be provided by a bitmap. An entry in the bit map may represent a PRB or a part of a PRB. The length of the bitmap may correspond to the bandwidth (e.g. measured in PRBs or partial PRBs) in which the PRACH can be transmitted. For example, if the carrier has a bandwidth of B PRBs, the bitmap has a length of B bits. Moreover, the length of the bitmap may correspond to the spacing between two PRBs of the interlace. An advantage of this is that the bitmap may be shorter, i.e. requiring less signaling overhead. For example, if the interlace comprises PRBs where the PRBs are separated by X PRBs, the bitmap may be of size X bits. Furthermore, a bitmap allows allocating more than one interlace for the PRACH, and the interlaces do not need to be consecutive. Moreover, for some carrier bandwidths (e.g. 106 PBRs) there may be interlaces of different sizes (i.e. some PRB-interlaces with 10 PRBs and some with 11 PRBs) and a bitmap may provide such allocations.

Interlace index: the information of the B-IFDM interlaces may be provided by an interlace index. The mapping from index to interlace may be stored both at a transmitter and a receiver. This allows any arbitrary construction of the interlaces, e.g. non-contiguous interlaces. This may allow optimizing the set of used interlaces with respect to maximizing the transmit power subject to the PSD constraint by suitably selecting the spacing of the PRBs within the interlace(s) allocated to PRACH. Hence, one interlace index may effectively correspond to allocation of more than one interlace. With X supported interlace indexes, $\log_2 X$ bits are needed for the associated signaling.

Subcarrier spacing: the subcarrier spacing may either be signaled in the system information, or alternatively it may be predetermined, e.g. for a given frequency band.

A number of at least one subset of REs within the PRB which are available for PRACH transmission may be provided to the client device 100. In the following, PRB may represent a PRB, a partial PRB or the smallest entity of the PRB interlace. The client device 100 may either randomly select a subset of REs within the PRB from the available at least one subset (e.g. for initial access) or be allocated a particular subset of REs within the PRB (e.g. for a connected client device 100). Pre-determined rules may define whether PRACH is transmitted on one or several of the REs within the PRB and, in the latter case, how they are located (e.g. contiguously or distributed according to a known pattern). For initial access, the client device 100 may only need to know the at least one subset of REs and randomly choose (according to pre-defined rules: e.g. a single RE, multiple contiguous REs, multiple distributed REs etc.) one subset of RE(s). For other purposes of the RACH preamble, where the REs are not randomly chosen, the actual REs (i.e. not only the set of possible REs) to be used are provided to the client device 100. The set of REs for PRACH preamble exclude those REs serving as guard REs at the edge of the PRB, if needed.

In an example, the at least subset of REs is predetermined and is not signaled to the client device 100.

The following discusses examples for encoding the information of one or several REs within the interlaces.

Resource Indication Value (RIV) within the PRB: an advantage of allocating consecutive subcarriers is that the corresponding signaling can be made efficient requiring fewer bits. An RIV within the PRB may be used to indicate each of the at least one subset of REs within the PRB. This can allocate a set of contiguous REs within the PRB. Each subset of allocated REs in the PRB may comprise the starting RE, RESTART, the number of REs in the PRB/partial PRB, N, and the number of contiguous REs, L, where the RIV is defined by:

$$\begin{aligned}&\text{if } (L-1) \leq \lfloor N/2 \rfloor \text{ then}\\&\qquad \text{RIV}=N(L-1)+\text{RE}_{START}\\&\text{else}\\&\qquad \text{RIV}=N(N-L+1)+(N-1-\text{RE}_{START})\end{aligned}$$

If L(N) is known, the RESTART and N(L) may be uniquely determined.

For random access, an allocation with L≥M may be used, while for other purposes where the PRACH preamble is not randomly selected, L=M, where M is the length of the PRACH preamble sequence in a PRB.

Bitmap: a bitmap is used to indicate each of the at least one subset of REs. The length of the bitmap may be equal to the number of REs in a PRB or the number of REs in a partial PRB, i.e. the smallest entity of the PRB interlace. An advantage of this is that any set (i.e. including non-contiguous REs) of REs can be formed.

Index: an index may be used to indicate each of the at least one subset of REs. The mapping from index to a subset of REs may be stored both at a transmitter and a receiver. This allows any arbitrary construction of the subset of REs. This may offer lower signaling compared to a bitmap assuming not all RE locations are utilized.

Furthermore, the information about the B-IFDM interlace, subcarrier spacing and REs within the PRB interlace may either be separately or jointly encoded. Joint encoding may provide further overhead reduction assuming not all combinations of PRB interlace, subcarrier spacing and REs within the PRB interlace are feasible.

The functionality described herein can be performed, at least in part, by one or more computer program product components such as software components. According to an embodiment, the client device 100 and/or network node device 110 comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A client device for wireless communication, the client device comprising: a transceiver, and a processor, wherein:
   the transceiver is configured to receive frequency resource information to indicate a set of frequency resources for a physical random access channel (PRACH) preamble transmission, the received frequency resource information being configured:
   to indicate each frequency resource comprising: an interlace information indicating at least one of an interlace of a block-interlaced frequency-division multiplexing (B-IFDM) allocation, a resource element allocation information indicating a subset of resource elements within each block of the at least one B-IFDM interlace, and a resource element spacing information,
   such that an at least one resource element within at least one block of the at least one B-IFDM interlace is allocated for the transmission of one PRACH preamble according to a tone-interlaced frequency-division multiplexing (T-IFDM) allocation, and the resource element allocation is repeated in each block of the at least one B-IFDM interlace, wherein a distribution of the subset of resource elements within each block of the at least one B-IFDM interlace is non-uniform;
   the processor is configured to select a frequency resource of the set of frequency resources based at least partially on the received frequency resource information, and to generate a PRACH preamble to be transmitted on the selected frequency resource; and
   the transceiver is further configured to transmit the generated PRACH preamble on the selected frequency resource.

2. The client device according to claim 1, wherein the subset of resource elements comprises a set of subcarriers, and wherein the resource element spacing information comprises subcarrier spacing information.

3. The client device according to claim 1, wherein the blocks in each T-IFDM based PRACH allocation of the multiple T-IFDM based PRACH allocations have the same frequency spacing.

4. The client device according to claim 1, wherein the multiple T-IFDM based PRACH allocations are frequency-division multiplexed inside the at least one B-IFDM interlace.

5. The client device according to claim 1, wherein at least one resource element in each block of the at least one B-IFDM interlace is reserved.

6. The client device according to claim 1, wherein the at least one B-IFDM interlace is indicated with a resource indication value (RIV), a bitmap, or an integer index.

7. The client device according to claim 1, wherein the subset of resource elements within each block of the at least one B-IFDM interlace is indicated with a resource indication value (RIV), a bitmap or an integer index.

8. The client device according to claim 1, wherein the processor is further configured to obtain a remaining part of the frequency resource information from data stored in the client device.

9. The client device according to claim 1, wherein a remaining part of the frequency resource information comprises pre-determined information or carrier frequency—specific information.

10. A method, the method comprising:
    receiving, by a transceiver in a client device for wireless communication, frequency resource information to indicate a set of frequency resources for a physical random access channel (PRACH) preamble transmission, the received frequency resource information being configured:
    to indicate each frequency resource comprising: an interlace information indicating at least one of an interlace of a block-interlaced frequency-division multiplexing (B-IFDM) allocation, a resource element allocation information indicating a subset of resource elements within each block of the at least one B-IFDM interlace, and a resource element spacing information,
    such that an at least one resource element within at least one block of the at least one B-IFDM interlace is allocated for the transmission of one PRACH preamble according to a tone-interlaced frequency-division multiplexing (T-IFDM) allocation and the resource element allocation is repeated in each block of the at least one B-IFDM interlace, wherein a distribution of the subset of resource elements within each block of the at least one B-IFDM interlace is non-uniform;

selecting, by a processor in the client device for wireless communication, a frequency resource of the set of frequency resources based at least partially on the received frequency resource information;

generating, by the processor in the client device for wireless communication, a PRACH preamble to be transmitted on the selected frequency resource; and transmitting, by the transceiver in the client device for wireless communication, the generated PRACH preamble on the selected frequency resource.

11. A non-transitory computer readable medium comprising program code configured to perform the method according to claim 10, when the computer program is executed on a computer.

12. A network node device for wireless communication, comprising a transceiver and a processor, wherein:
the transceiver is configured to:
transmit frequency resource information to indicate a set of frequency resources for physical random access channel (PRACH) preamble transmission, the transmitted frequency resource information being configured:
to indicate each frequency resource comprising: an interlace information indicating at least one of an interlace of a block-interlaced frequency-division multiplexing (B-IFDM) allocation, a resource element allocation information indicating a subset of resource elements within each block of the at least one B-IFDM interlace, and a resource element spacing information,
such that an at least one resource element within at least one block of the at least one B-IFDM interlace is allocated for the transmission of one PRACH preamble according to a tone-interlaced frequency-division multiplexing (T-IFDM) allocation and the resource element allocation is repeated in each block of the at least one B-IFDM interlace, wherein a distribution of the subset of resource elements within each block of the at least one B-IFDM interlace is non-uniform; and
receive a signal comprising at least one PRACH preamble, each of the at least one PRACH preambles transmitted on one frequency resource of the indicated set of frequency resources, and the processor is configured to derive at least one index from the received signal, each derived index corresponding to one of the PRACH preambles contained in the received signal.

13. The network node device according to claim 12, wherein at least two PRACH preambles are transmitted on the same frequency resource of the indicated set of frequency resources.

14. The network node device according to claim 12, wherein at least two PRACH preambles are transmitted on different frequency resources of the indicated set of frequency resources.

15. A method, the method comprising:
transmitting, by a transceiver in a network node device for wireless communication, frequency resource information to indicate a set of frequency resources for physical random access channel (PRACH) preamble transmission, the transmitted frequency resource information for:
indicating each frequency resource comprising: an interlace information indicating at least one of an interlace of a block-interlaced frequency-division multiplexing (B-IFDM) allocation, a resource element allocation information indicating a subset of resource elements within each block of the at least one B-IFDM interlace, and a resource element spacing information,
such that an at least one resource element within at least one block of the at least one B-IFDM interlace is allocated for the transmission of one PRACH preamble according to a tone-interlaced frequency-division multiplexing (T-IFDM) allocation and the resource element allocation is repeated in each block of the at least one B-IFDM interlace, wherein a distribution of the subset of resource elements within each block of the at least one B-IFDM interlace is non-uniform;
receiving, by the transceiver in the network node device for wireless communication, a signal comprising at least one PRACH preamble, each of the at least one PRACH preambles transmitted on one frequency resource of the indicated set of frequency resources;
deriving , by a processor in the network node device for wireless communication, at least one index from the received signal, each derived index corresponding to one of the PRACH preambles contained in the received signal.

16. A non-transitory computer readable storage medium comprising program code configured to perform the method according to claim 15, when the computer program is executed on a computer.

* * * * *

UNITED STATES PATENT AND TRADEMARK OFFICE
CERTIFICATE OF CORRECTION

PATENT NO. : 11,950,214 B2
APPLICATION NO. : 17/150915
DATED : April 2, 2024
INVENTOR(S) : Pitaval et al.

It is certified that error appears in the above-identified patent and that said Letters Patent is hereby corrected as shown below:

In the Claims

Claim 12: Column 25, Line 29: "to indicate each frequency resource comprising at: an" should read -- to indicate each frequency resource comprising: an --.

Signed and Sealed this
Thirtieth Day of July, 2024

Katherine Kelly Vidal
*Director of the United States Patent and Trademark Office*